US010672142B2

(12) United States Patent
Yamao

(10) Patent No.: US 10,672,142 B2
(45) Date of Patent: Jun. 2, 2020

(54) OBJECT RECOGNITION APPARATUS, METHOD FOR RECOGNIZING OBJECT, AND NON-TRANSITORY COMPUTER-READABLE STORAGE MEDIUM FOR STORING PROGRAM

(71) Applicant: FUJITSU LIMITED, Kawasaki-shi, Kanagawa (JP)

(72) Inventor: Sosuke Yamao, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/213,383

(22) Filed: Dec. 7, 2018

(65) Prior Publication Data

US 2019/0197728 A1 Jun. 27, 2019

(30) Foreign Application Priority Data

Dec. 25, 2017 (JP) ................................ 2017-248266

(51) Int. Cl.
*G06T 7/73* (2017.01)
*G06K 9/62* (2006.01)
(Continued)

(52) U.S. Cl.
CPC ............ *G06T 7/74* (2017.01); *G06K 9/00664* (2013.01); *G06K 9/46* (2013.01); *G06K 9/6202* (2013.01);
(Continued)

(58) Field of Classification Search
CPC ............... H04N 13/128; H04N 13/275; H04N 2013/0081; G06T 15/00; G06T 2207/10012; G06T 2207/10028; G06T 17/00; G06T 7/74; G06T 11/00; G06T 3/20; G06T 3/60; G06T 2207/10024;
(Continued)

(56) References Cited

U.S. PATENT DOCUMENTS

2008/0284864 A1 11/2008 Kotake et al.
2011/0261221 A1* 10/2011 Shikatani ............ G09B 29/003 348/222.1

(Continued)

FOREIGN PATENT DOCUMENTS

JP 2008-046750 A 2/2008
JP 2012-008867 A 1/2012

(Continued)

*Primary Examiner* — Haixia Du
(74) *Attorney, Agent, or Firm* — Fujitsu Patent Center

(57) ABSTRACT

An object recognition apparatus includes: a memory; and a processor coupled to the memory and configured to execute an acquisition process that includes acquiring RGB-depth (D) image data on a target object in which an object is stored, the RGB-D image data being acquired by an RGB-D camera; execute a presumption process that includes presuming a frontmost plane of the target object from the acquired RGB-D image data; execute a sorting process that includes sorting features of the target object at a position specified by the presumed frontmost plane from among features extracted based on the RGB-D image data; and execute a computing process that includes computing a position and an orientation of the target object by performing matching between the RGB-D image data and a template of the target object using the sorted features.

15 Claims, 22 Drawing Sheets

(51) Int. Cl.

| | |
|---|---|
| ***G06K 9/00*** | (2006.01) |
| ***G06K 9/46*** | (2006.01) |
| ***G06T 11/00*** | (2006.01) |
| ***G06T 3/20*** | (2006.01) |
| ***G06T 3/60*** | (2006.01) |

(52) U.S. Cl.
CPC ............ *G06K 9/6203* (2013.01); *G06T 11/00* (2013.01); *G06T 3/20* (2013.01); *G06T 3/60* (2013.01); *G06T 2207/10024* (2013.01); *G06T 2207/10028* (2013.01); *G06T 2207/30244* (2013.01)

(58) Field of Classification Search
CPC ...... G06T 2207/30244; G06K 9/00664; G06K 9/46; G06K 9/6202; G06K 9/6203
See application file for complete search history.

(56) References Cited

U.S. PATENT DOCUMENTS

| | | | | |
|---|---|---|---|---|
| 2013/0181983 | A1 | 7/2013 | Kitamura et al. | |
| 2015/0125035 | A1 | 5/2015 | Miyatani et al. | |
| 2017/0243352 | A1* | 8/2017 | Kutliroff .................. | G06T 7/10 |

FOREIGN PATENT DOCUMENTS

| | | | |
|---|---|---|---|
| JP | 2015-049776 | A | 3/2015 |
| JP | 2015-090560 | A | 5/2015 |

* cited by examiner

| STORAGE-REGION DEFINITION INFORMATION (OPEN CABINET ID = "T001", RFG-D CAMERA ID = "C001") | | |
|---|---|---|
| SHELF NUMBER | SHELF IDENTIFIER | OPEN-CABINET COORDINATE SYSTEM |
| FIRST SHELF | D001 | $(x_{t1}, y_{t1}, z_{t1})$ |
| SECOND SHELF | D002 | $(x_{t2}, y_{t2}, z_{t2})$ |
| THIRD SHELF | D003 | $(x_{t3}, y_{t3}, z_{t3})$ |
| | | |

| STORED-OBJECT INFORMATION 1800 ||
|---|---|
| STORAGE SHELF | STORED OBJECT |
| OPEN CABINET ID = "T001" | D001 | 1801 |
| | D002 | |
| | D003 | |

| STORED-OBJECT INFORMATION ||
|---|---|
| STORAGE SHELF | STORED OBJECT |
| OPEN CABINET ID = "T001" | D001 |
| ^ | D002 |
| ^ | D003 |

OBJECT RECOGNITION APPARATUS, METHOD FOR RECOGNIZING OBJECT, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2017-248266, filed on Dec. 25, 2017, the entire contents of which are incorporated herein by reference.

FIELD

The embodiments discussed herein are related to an apparatus and a method for recognizing an object, and a non-transitory computer-readable storage medium for storing a program.

BACKGROUND

There is known an object recognition apparatus that performs matching with RGB-depth (D) image data acquired by an RGB-D camera by using a template to recognize the position and the orientation of an object corresponding to the template. The object recognition apparatus correctly recognizes the position and the orientation of an object without attaching markers or the like to the object provided that the appearance of the object is photographed by the RGB-D camera.

Examples of the related art include Japanese Laid-open Patent Publication No. 2015-90560.

SUMMARY

According to an aspect of the embodiments, an object recognition apparatus includes: a memory; and a processor coupled to the memory and configured to execute an acquisition process that includes acquiring RGB-depth (D) image data on a target object in which an object is stored, the RGB-D image data being acquired by an RGB-D camera; execute a presumption process that includes presuming a frontmost plane of the target object from the acquired RGB-D image data; execute a sorting process that includes sorting features of the target object at a position specified by the presumed frontmost plane from among features extracted based on the RGB-D image data; and execute a computing process that includes computing a position and an orientation of the target object by performing matching between the RGB-D image data and a template of the target object using the sorted features.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a diagram illustrating a specific example of storage-region definition information;

DESCRIPTION OF EMBODIMENTS

There may a case where an object is stored in an open cabinet or the like, so that part of the object is hidden, and an image of the appearance of the object is not acquired. In such a case, it is preferable to first acquire an image of the open cabinet as a recognition target object to recognize the position and the orientation of the open cabinet and recognize the stored object.

However, when an object is stored in the open cabinet, the appearance of the open cabinet will change due to the influence of the object. For that reason, even if matching is performed using the template of the open cabinet in which no object is stored, it is not easy to correctly recognize the position and orientation of the open cabinet. Moreover, it is not practical to create the templates of the open cabinet for all storage patterns of all objects.

In one aspect, an object of the embodiments is to allow recognizing the position and the orientation of a target object in which an object is stored.

The embodiments will be described hereinbelow with reference to the accompanying drawings. Components having substantially the same functional configuration in the specification and drawings are given the same reference sign, and a description will be omitted.

First Embodiment

<System Configuration of Object Recognition System>

Figure 1:
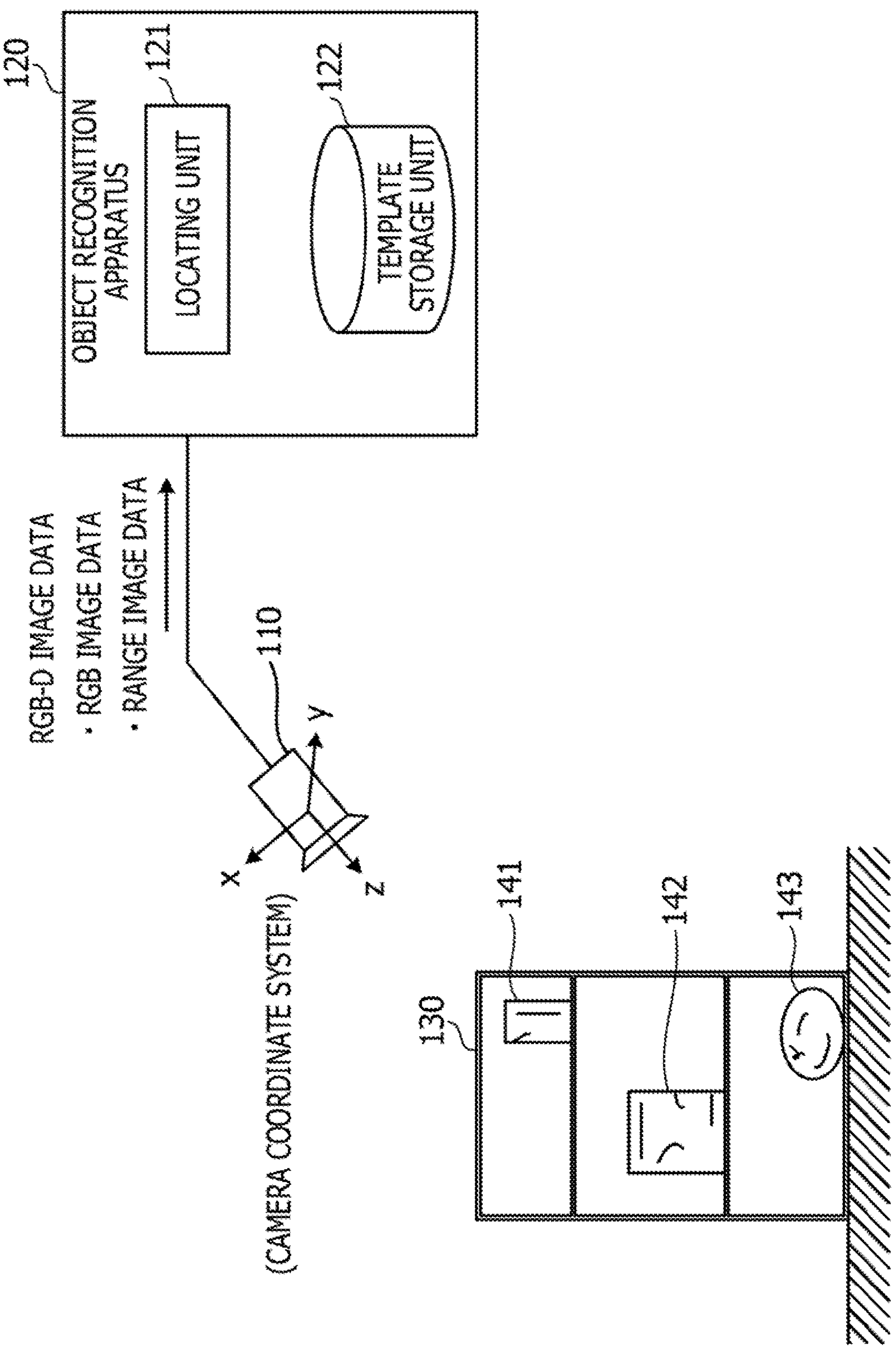
FIG. 1 is a diagram illustrating an example of the system configuration of an object recognition system according to a first embodiment of the present disclosure.

The system configuration of an object recognition system will be described. FIG. 1 is a diagram illustrating an example of the system configuration of an object recognition system according to a first embodiment. As illustrated in FIG. 1, the object recognition system 100 includes an RGB-D camera 110 and an object recognition apparatus 120. The RGB-D camera 110 and the object recognition apparatus 120 are connected so as to communicate with each other.

The RGB-D camera 110 acquires an image of an open cabinet 130 and creates RGB (red, green, and blue) image data and range image data (depth (D) image data) in a camera coordinate system (x, y, z). The RGB-D camera 110 transmits RGB-D image data including the created RGB image data and range image data to the object recognition apparatus 120.

In the first embodiment, a target object to be recognized by the object recognition apparatus 120 is the open cabinet 130. The open cabinet 130 stores objects (stored objects 141, 142, and 143) on the individual shelves. The RGB-D camera 110 repeatedly performs image-acquisition while changing the direction of image-acquisition so that the individual shelves come to the center of image-acquisition.

A location program is installed in the object recognition apparatus 120. As the program is executed, the object recognition apparatus 120 functions as a locating unit 121.

The locating unit 121 recognizes the position and the orientation of the open cabinet 130 by performing a matching process on the RGB-D image data transmitted from the RGB-D camera 110 using the template of the open cabinet 130. A template storage unit 122 stores the templates of the open cabinet 130.

<Hardware Configuration of Object Recognition Apparatus>

Figure 2:
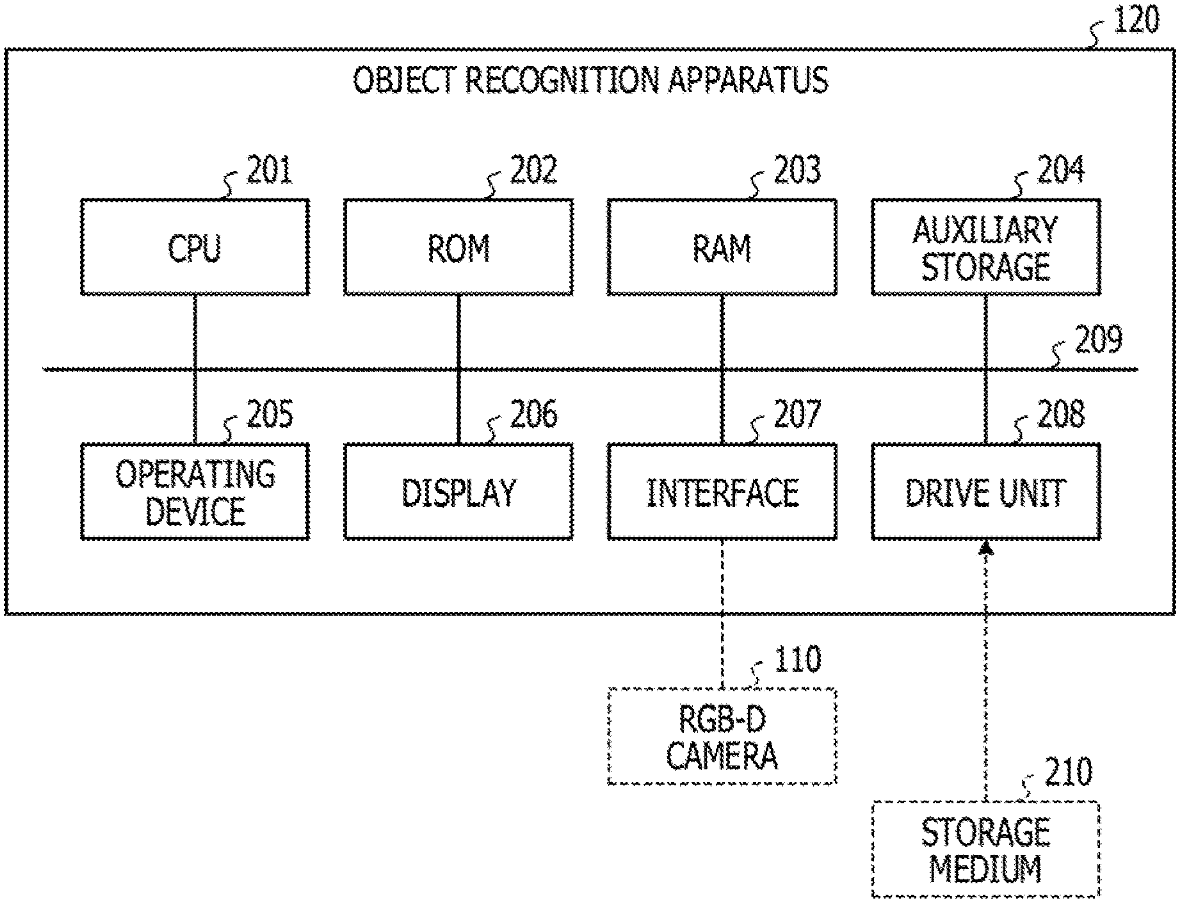
FIG. 2 is a diagram illustrating an example of the hardware configuration of the object recognition apparatus.

Next, the hardware configuration of the object recognition apparatus 120 will be described. FIG. 2 is a diagram illustrating an example of the hardware configuration of the object recognition apparatus 120.

As Illustrated in FIG. 2, the object recognition apparatus 120 includes a central processing unit (CPU) 201, a read only memory (ROM) 202, and a random access memory (RAM) 203. The CPU 201, the ROM 202, and the RAM 203 constitute a computer. The object recognition apparatus 120 further includes an auxiliary storage 204, an operating device 205, a display 206, an interface (I/F) 207, and a drive unit 208. The hardware components of the object recognition apparatus 120 are connected to one another via a bus 209.

The CPU 201 executes various programs (for example, a location program) Installed in the auxiliary storage 204.

The ROM 202 is a non-volatile memory and functions as a main storage. The ROM 202 stores various programs and data that are used for the CPU 201 to execute the various programs installed in the auxiliary storage 204. For example, the ROM 202 stores a boot program, such as a basic input/output system (BIOS) or an extensible firmware interface (EFI), and so on.

The RAM 203 is a volatile memory, such as a dynamic random access memory (DRAM) or a static random access memory (SRAM), and function as a main storage. The RAM 203 provides a work area that is expanded when the various programs installed in the auxiliary storage 204 are executed by the CPU 201.

The auxiliary storage 204 stores various programs and information to be used when the various programs are executed by the CPU 201. The template storage unit 122 is implemented in the auxiliary storage 204.

The operating device 205 is an input device that the administrator of the object recognition apparatus 120 uses in putting various instructions to the object recognition apparatus 120. The display 206 is a display device that displays information in the object recognition apparatus 120.

The I/F 207 is a connecting device that is connected to the RGB-D camera 110 to communicate with the RGB-D camera 110.

The drive unit 208 is a device for use in setting a storage medium 210. Examples of the storage medium 210 include media that optically, electrically, or magnetically store information, such as a compact disc read only memory (CD-ROM), a flexible disk, and a magnetooptical disk. Other examples of the storage medium 210 include semiconductor memories that electrically store information, such as a ROM and a flash memory.

The various programs are installed in the auxiliary storage 204 in such a way that the distributed storage medium 210 is set in the drive unit 208, and the various programs stored in the storage medium 210 are read by the drive unit 208.

<Functional Configuration of Locating Unit of Object Recognition Apparatus>

Figure 3:
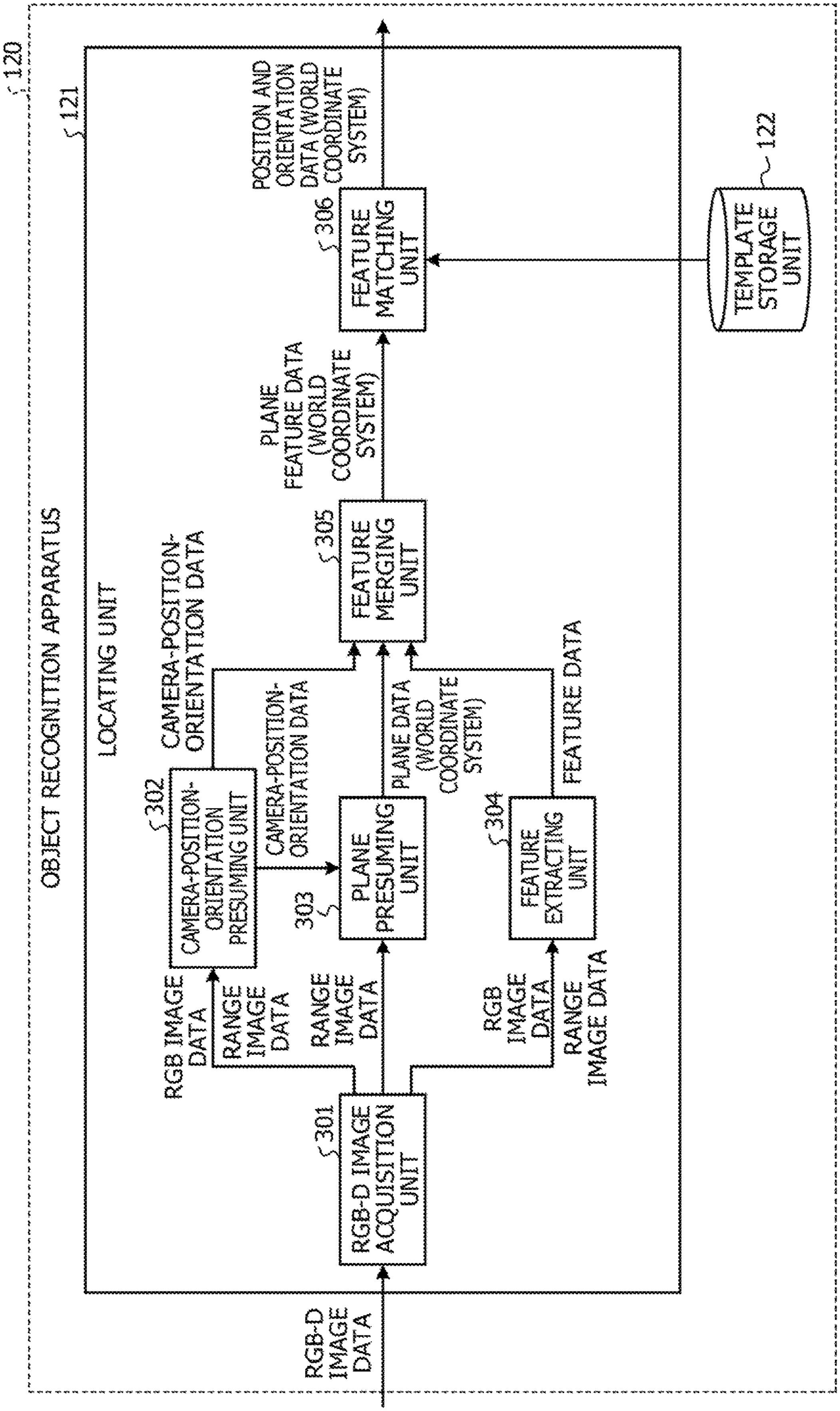
FIG. 3 is a diagram illustrating an example of the functional configuration of a locating unit of the object recognition apparatus.

The functional configuration of the locating unit 121 of the object recognition apparatus 120 will be described. FIG. 3 is a diagram illustrating an example of the functional configuration of the locating unit 121 of the object recognition apparatus 120. As illustrated in FIG. 3, the locating unit 121 of the object recognition apparatus 120 includes an RGB-D image acquisition unit 301, a camera-position-orientation presuming unit 302, a plane presuming unit 303, a feature extracting unit 304, a feature merging unit 305, and a feature matching unit 306.

The RGB-D image acquisition unit 301 is an example of an acquisition unit. The RGB-D image acquisition unit 301 acquires RGB-D image data transmitted from the RGB-D camera 110 and notifies the camera-position-orientation presuming unit 302 of RGB image data and range image data contained in the RGB-D image data and notifies the plane presuming unit 303 of the range image data. The RGB-D image acquisition unit 301 also sends the RGB image data and the range image data contained in the RGB-D image data to the feature extracting unit 304.

The RGB-D image acquisition unit 301 acquires RGB-D image data (RGB-D image data acquired at the Nth time, RGB-D image data acquired at the (N+1)th time, . . . ), with each shelf of the open cabinet 130 as the center, from the RGB-D camera 110 in sequence, where N is an integer equal to or greater than 1.

The camera-position-orientation presuming unit 302 computes the position and the orientation of the RGB-D camera 110 based on the RGB image data and the range image data. The camera-position-orientation presuming unit 302 computes the position and the orientation of the RGB-D camera 110 using a simultaneous localization and mapping (SLAM)

technique or the like. The camera-position-orientation presuming unit 302 reports the computed camera-position-orientation data to the plane presuming unit 303 and the feature merging unit 305.

The plane presuming unit 303 is an example of a presuming unit. The plane presuming unit 303 presumes a plane forming the frontmost plane of the open cabinet 130 based on the range image data. The plane presuming unit 303 converts plane data indicating the presumed plane to the world coordinate system based on the camera-position-orientation data.

The plane presuming unit 303 performs the presumption of a plane forming the frontmost plane of the open cabinet 130 and the conversion of the plane data to the world coordinate system for each of the shelves of the open cabinet 130 (each shelf centered in image-acquisition). For example, the plane presuming unit 303 performs the presumption and the conversion on each of the RGB-D image data acquired at the Nth time (N is an integer equal to or greater than 1) and the RGB-D image data acquired at the (N+1)th time. The plane presuming unit 303 updates the plane data indicating a plane forming the frontmost plane of the open cabinet 130 using plane data on a shelf for which the presumption and conversion have already been completed and plane data on a shelf for which the presumption and conversion have been completed this time. The plane presuming unit 303 notifies the feature merging unit 305 of the updated plane data (the world coordinate system) as plane data presumed by the plane presuming unit 303.

The feature extracting unit 304 extracts various features from the RGB image data and the range image data and notifies the feature merging unit 305 of feature data indicating the extracted features. The features extracted by the feature extracting unit 304 include the positions of end points (corners), the positions of line segments (edges), line segment pairs, and the texture around each end point. The feature extracting unit 304 extracts the various features using, for example, Fast Point Feature Histograms (FGFH) or Point Pair Features (PPF).

The feature merging unit 305 is an example of a sorting unit. The feature merging unit 305 sorts feature data on planes specified by the plane data of the feature data reported from the feature extracting unit 304. The feature merging unit 305 merges the feature data on the planes and then converts the merged feature data to the world coordinate system based on the camera-position-orientation data. The feature merging unit 305 notifies the feature matching unit 306 of the converted feature data as plane feature data (in the world coordinate system).

The feature matching unit 306 is an example of a computing unit. The feature matching unit 306 computes the position and the orientation of the open cabinet 130 by reading the template of the open cabinet 130 from the template storage unit 122 and performing a matching process on the RGB-D image data using the plane feature data (in the world coordinate system). The feature matching unit 306 outputs the determined position and orientation of the open cabinet 130 as A (in the world coordinate system).

<Procedure for Locating Process of Locating Unit>

Figure 4:
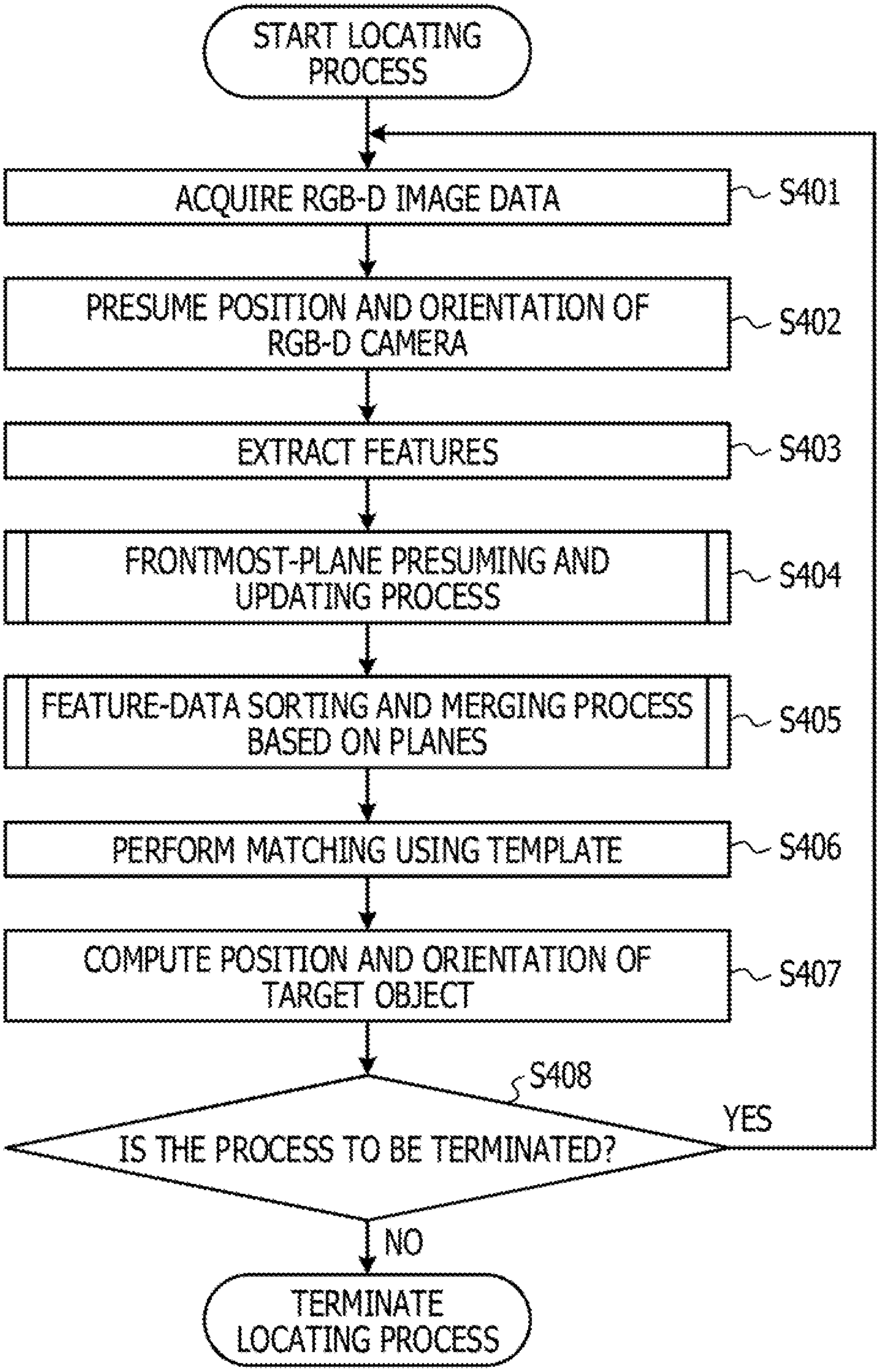
FIG. 4 is a flowchart illustrating the procedure for a locating process.

The procedure for the locating process performed by the locating unit 121 of the object recognition apparatus 120 will be described. FIG. 4 is a flowchart illustrating the procedure for the locating process.

In step S401, the RGB-D image acquisition unit 301 acquires RGB-D image data (for example, RGB-D image data centered on a predetermined shelf acquired at the Nth time) from the RGB-D camera 110. In step S402, the camera-position-orientation presuming unit 302 presumes the position and the orientation of the RGB-D camera 110 using RGB image data and range image data contained in the RGB-D image data. The RGB-D image acquisition unit 301 reports the camera-position-orientation data to the plane presuming unit 303 and the feature merging unit 305.

In step S403, the feature extracting unit 304 extracts the features from the RGB image data and the range image data contained in the RGB-D image data and notifies the feature merging unit 305 of feature data indicating the extracted features. A specific example of the process for extracting the features will be described later.

In step S404, the plane presuming unit 303 presumes the frontmost plane based on the range image data and converts the plane data to the world coordinate system based on the camera-position-orientation data. The plane presuming unit 303 updates plane data on a shelf for which the presumption and conversion have already been completed using plane data on a shelf for which the presumption and conversion have been completed at this time and reports the updated plane data to the feature merging unit 305. The details of the frontmost-plane presuming and updating process (step S404) will be described later.

In step S405, the feature merging unit 305 sorts feature data on planes specified by the plane data from among the feature data and merges the feature data. The details of the feature-data sorting and merging process based on the planes (step S405) will be described later.

In step S406, the feature matching unit 306 reads the template of the open cabinet 130 and performs a matching process on the RGB-D image data using the plane feature data. In step S407, the feature matching unit 306 computes the position and the orientation of the open cabinet 130 to be recognized and outputs the position and orientation data (in the world coordinate system).

In step S408, the RGB-D image acquisition unit 301 determines whether to terminate the locating process, and if the RGB-D image acquisition unit 301 determines not to terminate the process (No in step S408), the process returns to step S401. If in step S408 the RGB-D image acquisition unit 301 determines to terminate the locating process (YES in step S408), the locating process ends.

<Details of Locating Process>

Among the steps of the locating process (FIG. 4), step S403 (the process for extracting features), step S404 (the frontmost-plane presuming and updating process) and step S405 (the feature-data sorting and merging process based on the plane) will be described in detail.

(1) Details of Step S403 (the Process for Extracting Features)

Figure 5A:
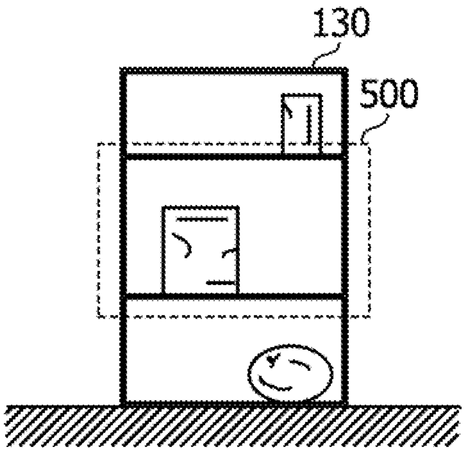
FIGS. 5A to 5C are diagrams illustrating an example of extraction of feature data.
Figure 5B:
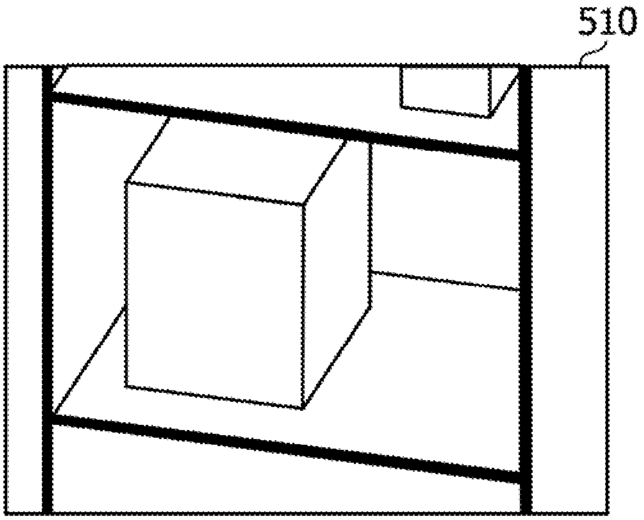
Figure 5C:
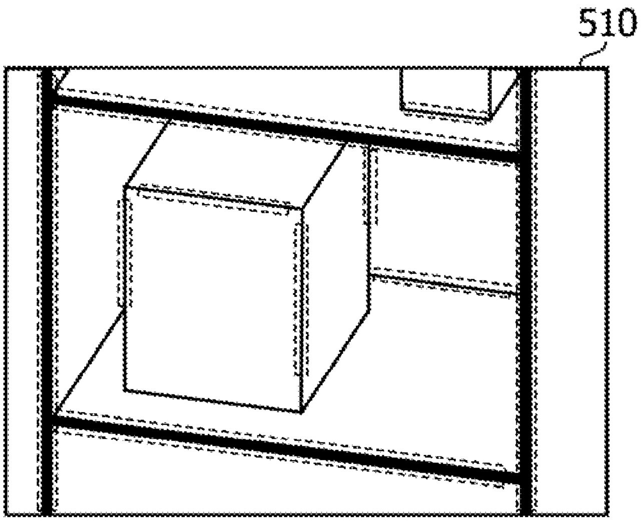

FIGS. 5A to 5C are diagrams illustrating an example of extraction of feature data. FIG. 5A is a diagram illustrating the open cabinet 130 photographed by the RGB-D camera 110 and a region 500 including a shelf centered in image-acquisition.

As described above, the RGB-D camera 110 takes photographs while changing the direction of image-acquisition so that each of the shelves of the open cabinet 130 comes to the center of image-acquisition. The example in FIG. 5A illustrates a state in which the direction of image-acquisition is changed so that the second shelf of the open cabinet 130 from the top comes to the center of image-acquisition.

FIG. 5B illustrates a state in which RGB-D image data 510 in the region 500 is extracted from the acquired RGB-D image data. FIG. 5C illustrates a state in which the features are extracted from the RGB-D image data 510. The example in FIG. 5C illustrates a state in which line segments (edges) are extracted as the features in the region indicated by the dotted lines.

(2) Details of Step S404 (Frontmost-Plane Presuming and Updating Process)

Figure 6:
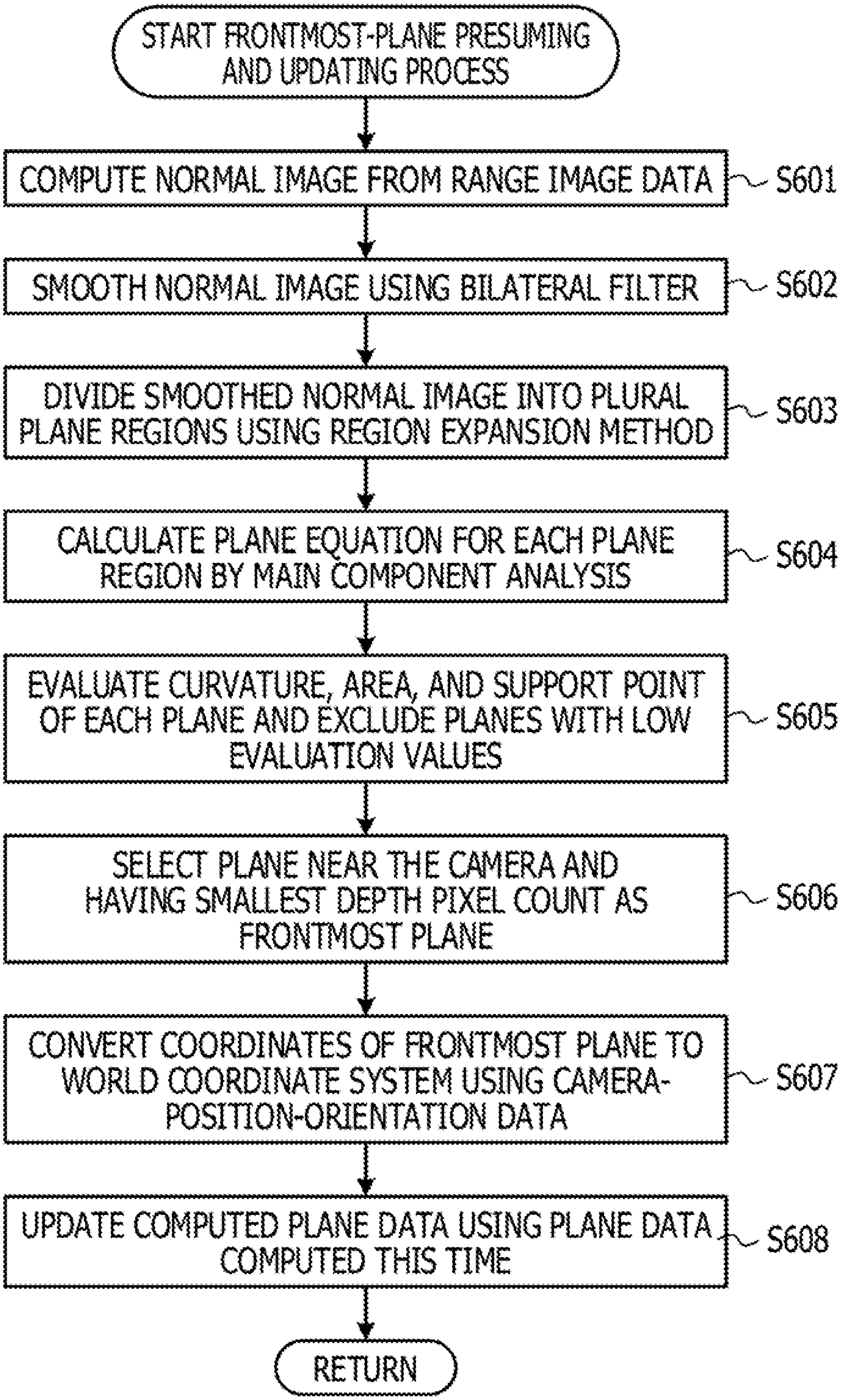
FIG. 6 is a flowchart illustrating the procedure for a frontmost-plane presuming and updating process.
Figure 7A:
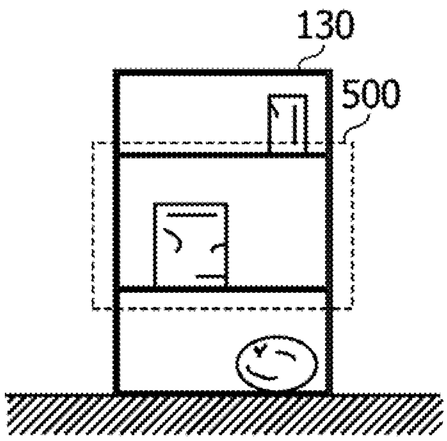
FIGS. 7A to 7C are diagrams illustrating a specific example of the frontmost-plane presuming and updating process.
Figure 7B:
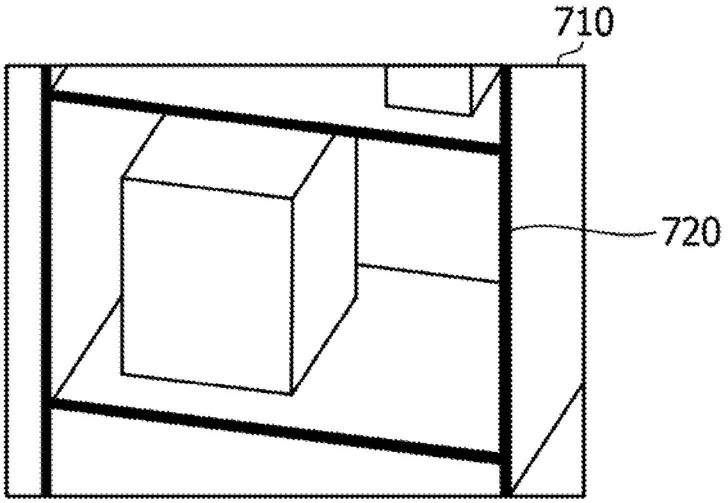
Figure 7C:
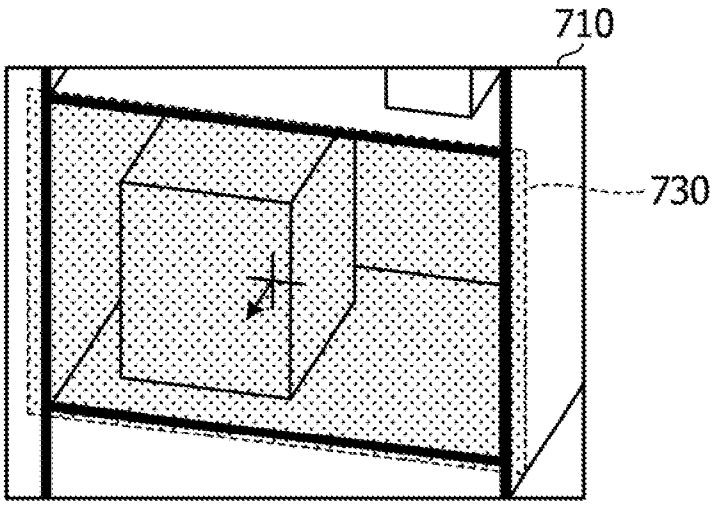

Step S404 (the frontmost-plane presuming and updating process) will be described with reference to FIG. 6 and FIGS. 7A to 7C. FIG. 6 is a flowchart illustrating the procedure for the frontmost-plane presuming and updating process. FIGS. 7A to 7C are diagrams illustrating a specific example of the frontmost-plane presuming and updating process. Referring to FIGS. 7A to 7C, the details of the process will be described according to FIG. 6.

In step S601, the plane presuming unit 303 computes a normal image from the range image data. FIG. 7A illustrates the region 500 from which the range image data is to be extracted from the acquired RGB-D image data. FIG. 78 illustrates a state in which range image data 710 in the region 500 is extracted. The plane presuming unit 303 computes a normal image on the extracted range image data 710.

In step S602, the plane presuming unit 303 smoothes the normal image using a bilateral filter. In step S603, the plane presuming unit 303 divides the smoothed normal image into a plurality of plane regions using a region expansion method. In FIG. 7B, a black plane region 720 in the range image data 710 is one of the plurality of divided plane regions.

In step S604, the plane presuming unit 303 presumes a plane for each of the plurality of divided plane regions by a main component analysis. For example, the plane presuming unit 303 calculates a plane equation for each of the plurality of plane regions. FIG. 7C illustrates a state in which the plane equation is calculated based on the black plane region 720 in FIG. 7B to presume a plane 730.

In step S605, the plane presuming unit 303 evaluates the curvatures, areas, support points, and so on of the presumed planes and excludes planes with low evaluation values.

In step S606, the plane presuming unit 303 counts the depth pixel counts in range image data near the RGB-D camera 110 for each of the remaining planes that are not excluded in step S605. The plane presuming unit 303 selects a plane having the smallest depth pixel count as the frontmost plane. FIG. 7C illustrates a state in which the plane 730 is selected as the frontmost plane.

In step S607, the plane presuming unit 303 converts the coordinates of the selected frontmost plane to the world coordinate system using the camera-position-orientation data.

In step S608, the plane presuming unit 303 updates the plane data (in the world coordinate system) on the shelf for which the presumption and conversion have already been completed using the plane data (in the world coordinate system) computed in step S607. For example, the plane presuming unit 303 updates the plane data (in world coordinate system) by calculating the mean value of the plane data (in the world coordinate system) for which the presumption and conversion have already been completed and the plane data (in the world coordinate system) converted in step S607. The plane presuming unit 303 sends the plane data (in the world coordinate system) as the plane data (in the world coordinate system) presumed by the plane presuming unit 303 to the feature merging unit 305.

(3) Details of Step S405 (the Feature-Data Sorting and Merging Process Based on Planes)

Figure 8:
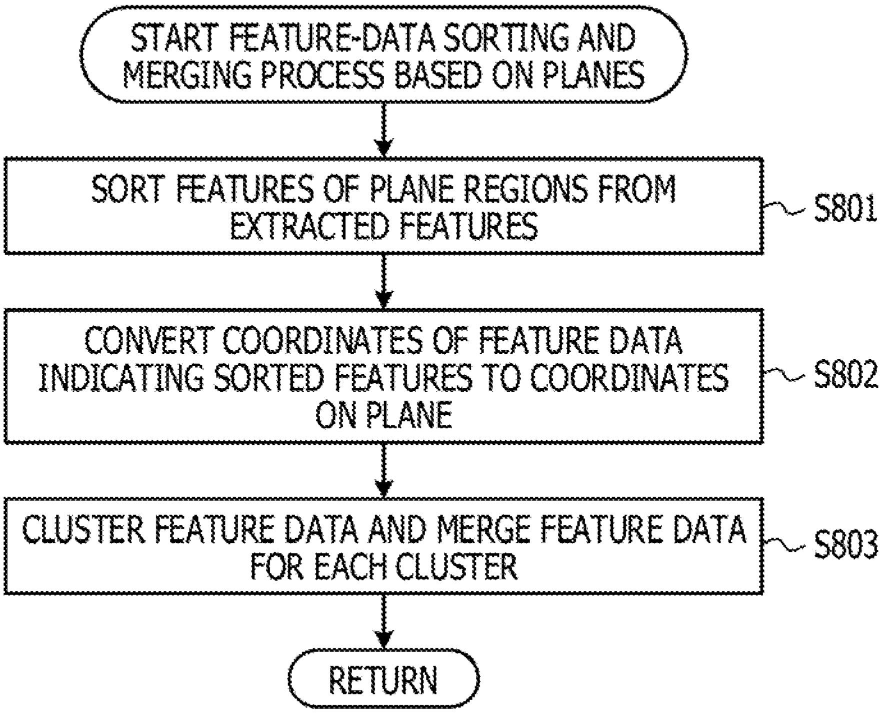
FIG. 8 is a flowchart illustrating the procedure for a feature-data sorting and merging process based on planes.
Figure 9A:
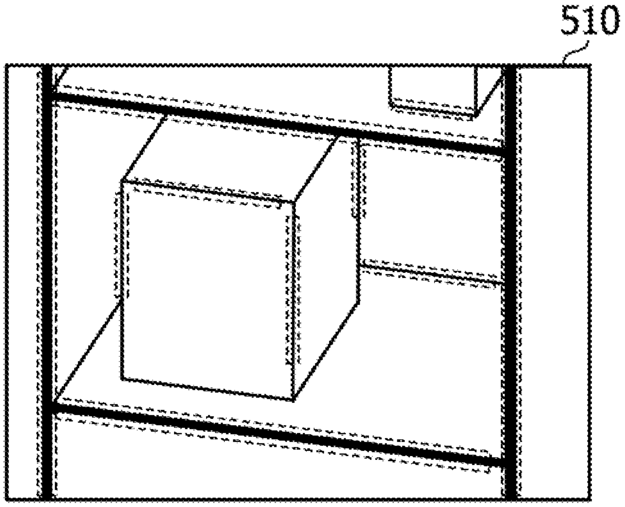
FIGS. 9A to 9C are diagrams illustrating a specific example of the feature-data sorting and merging process based on planes.
Figure 9B:
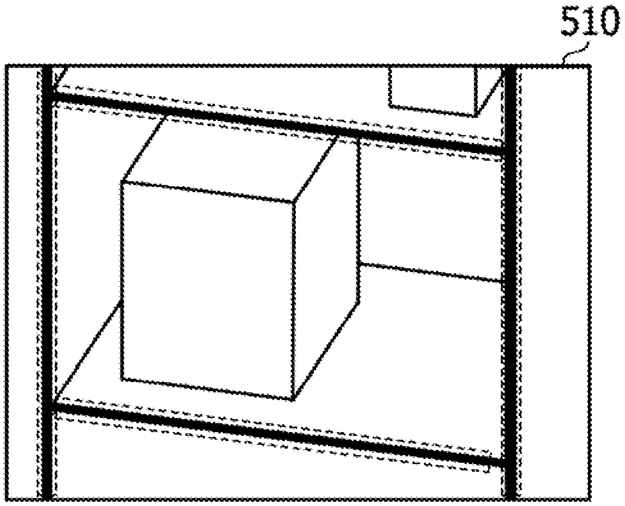
Figure 9C:
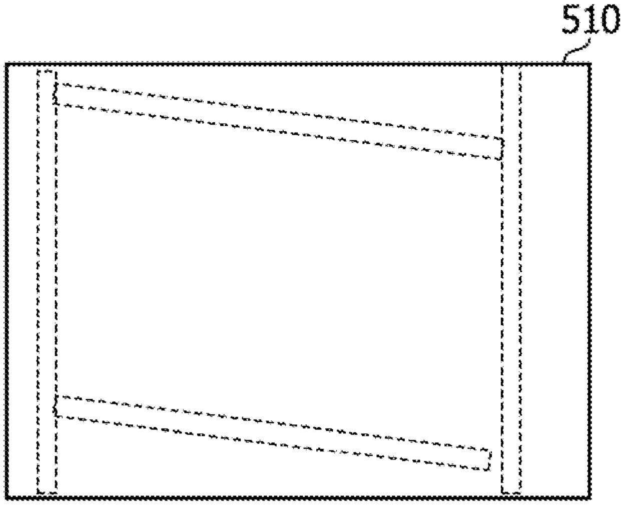

Step S405 (the feature-data sorting and merging process based on planes) will be described with reference to FIG. 8 and FIGS. 9A to 9C. FIG. 8 is a flowchart illustrating the procedure for the feature-data sorting and merging process based on planes. FIGS. 9A to 9C are diagrams illustrating a specific example of the feature-data sorting and merging process based on planes. Referring to FIGS. 9A to 9C, the details of the process will be described according to FIG. 8.

In step S801, the feature merging unit 305 sorts features of planes specified by the plane data among the features extracted by the feature extracting unit 304. In an RGB-D image data 510 in FIG. 9A, the regions indicated by the dotted lines indicate that features are extracted by the feature extracting unit 304. In the RGB-D image data 510 in FIG. 9B, the regions indicated by the dotted lines are regions in which the features extracted by the feature extracting unit 304 are sorted by the feature merging unit 305.

In step S802, the feature merging unit 305 converts the coordinates of the feature data indicating the features sorted in step S801 to the coordinates on the plane specified by the plane data.

In step S803, the feature merging unit 305 compares the feature data extracted, sorted, and converted from the RGB-D image data on the other shelves (computed feature data) with the feature data converted in step S802 (the feature data computed this time). When the computed feature data and the feature data computed this time are similar, the feature merging unit 305 merges the similar feature data together.

For example, the feature merging unit 305 dusters the calculated feature data and the feature data calculated this time and merges feature data classified in the same duster to one piece of feature data. FIG. 9C illustrates a state in which the feature data is merged. Thus merging the feature data reduces the number of feature data for use in reading the template and performing a matching process on the RGB-D image data. This allows reducing the process load on the object recognition apparatus 120 in the matching process.

As is apparent from the above description, the object recognition apparatus 120 according to the first embodiment acquires RGB-D image data on the open cabinet that stores objects, acquired by the RGB-D camera, and presumes the frontmost plane of the open cabinet from the RGB-D image data. The object recognition apparatus 120 according to the first embodiment sorts the features of the open cabinet in the presumed plane from the features of the open cabinet extracted from the RGB-D image data. The object recognition apparatus 120 according to the first embodiment computes the position and the orientation of the open cabinet by performing a matching process on the RGB-D image data and the template of the open cabinet using the sorted features.

Thus, the object recognition apparatus 120 according to the first embodiment may correctly recognize the position and the orientation of the open cabinet even when the open cabinet stores an object by performing a matching process using the features at the position that is not influenced by the stored object.

Second Embodiment

In the first embodiment, the position and the orientation of the open cabinet in which an object is stored is to be recognized. In contrast, in the second embodiment, a corresponding augmented reality (AR) content is superimposed on each of objects stored in the open cabinet whose position and orientation are recognized in the RGB-D image data for display. The second embodiment will be described focusing on differences from the first embodiment.

<System Configuration of Object Recognition System>

Figure 10:
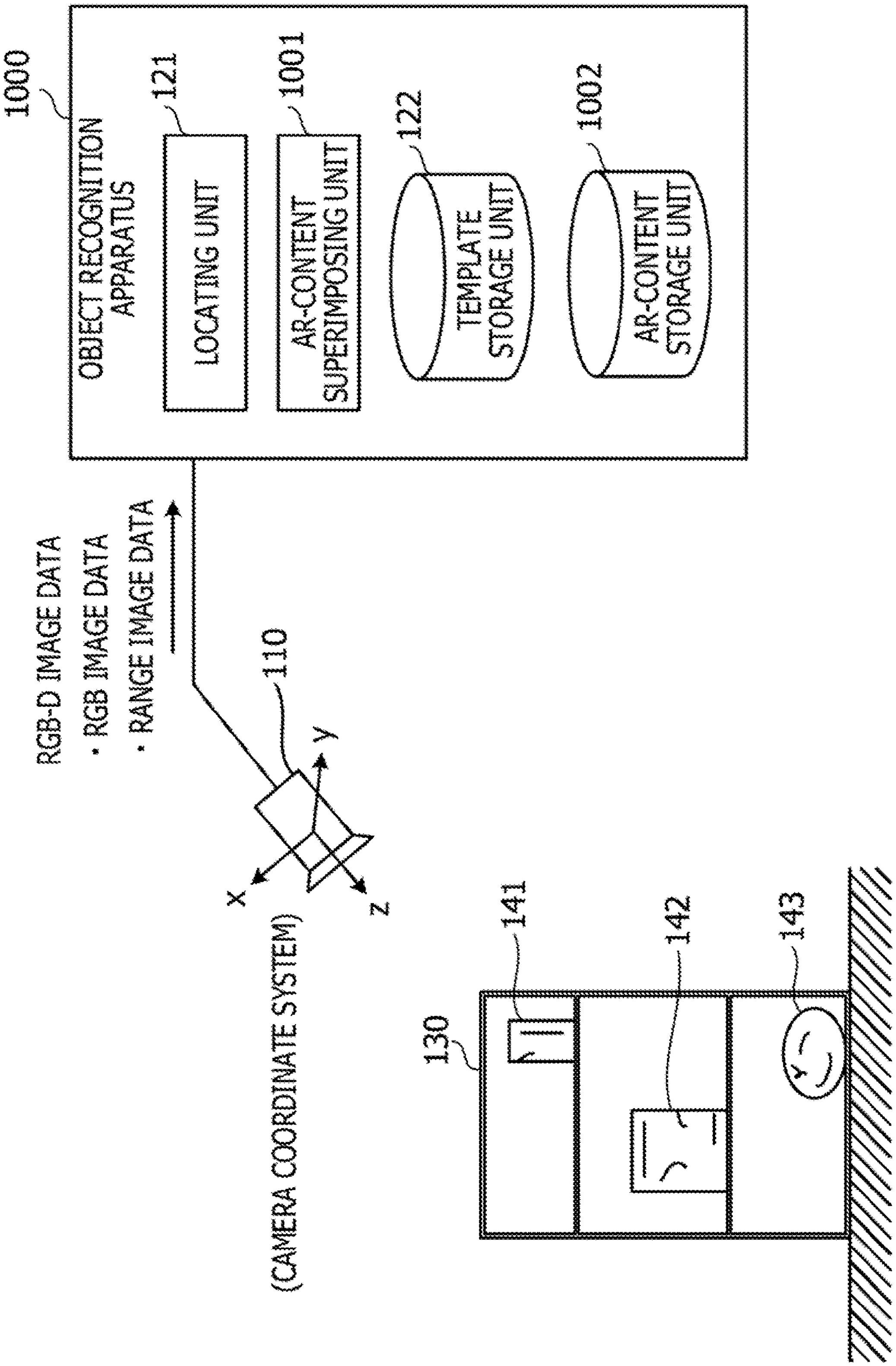
FIG. 10 is a diagram illustrating an example of the system configuration of an object recognition system according to a second embodiment of the present disclosure.

First, the system configuration of the object recognition system will be described. FIG. 10 is a diagram illustrating an example of the system configuration of the object recognition system 100 according to the second embodiment. The differences from the object recognition system 100 described with reference to FIG. 1 is that an object recognition apparatus 1000 has the function of an AR-content superimposing unit 1001, in addition to the locating unit 121, and an AR-content storage unit 1002.

The AR-content superimposing unit 1001 reads AR contents stored in the AR-content storage unit 1002. The AR-content storage unit 1002 stores AR contents individually corresponding to objects 141, 142, and 143 stored in the open cabinet 130.

The AR-content superimposing unit 1001 converts the coordinates of the read AR contents based on the position and orientation data on the open cabinet 130 output from the locating unit 121 to change the position and the orientation. The AR-content superimposing unit 1001 superimposes the AR contents on the RGB-D image data based on the changed position and orientation. This allows outputting the RGB-D image data on which the AR contents are superimposed.

<Functional Configuration of AR-Content Superimposing Unit>

Figure 11:
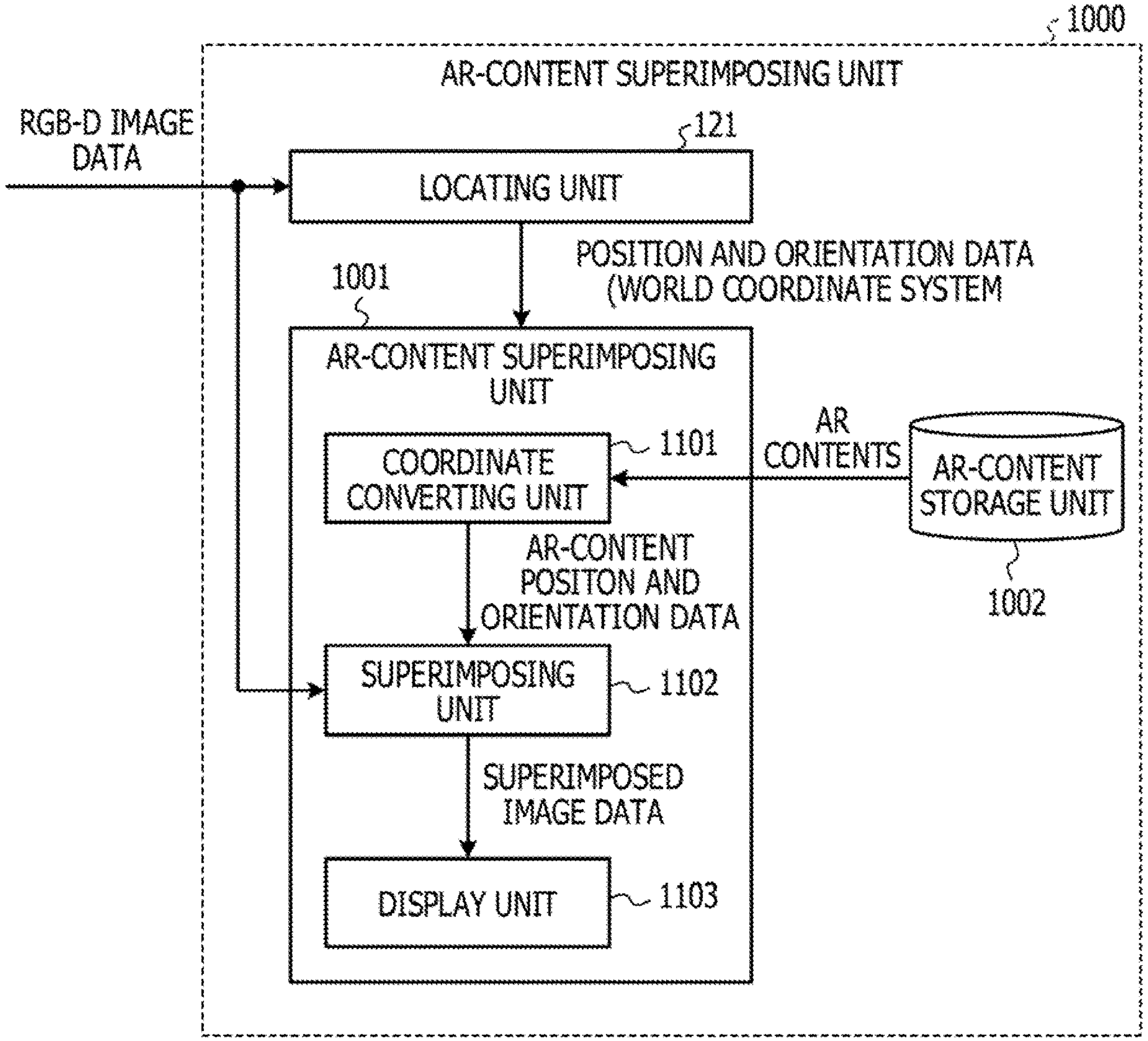
FIG. 11 is a diagram illustrating an example of the functional configuration of an AR-content superimposing unit of the object recognition apparatus.

The functional configuration of the AR-content superimposing unit 1001 of the object recognition apparatus 1000 will be described. FIG. 11 is a diagram illustrating an example of the functional configuration of the AR-content superimposing unit 1001 of the object recognition apparatus 1000. As illustrated in FIG. 11, the AR-content superimposing unit 1001 includes a coordinate converting unit 1101, a superimposing unit 1102, a display unit 1103.

The coordinate converting unit 1101 is an example of a changing unit. The coordinate converting unit 1101 reads AR contents corresponding to the objects 141, 142, and 143 stored in the open cabinet 130 from the AR-content storage unit 1002. The AR contents stored in the AR-content storage unit 1002 contain the coordinates indicating the positions of the corresponding objects 141, 142, and 143 in the open cabinet 130 (the coordinates in the open-cabinet coordinate system) in advance.

The coordinate converting unit 1101 changes the position and the orientation of each AR content by changing the coordinates contained in the AR content based on the position and orientation data of the open cabinet 130 output from the locating unit 121 to create AR-content position and orientation data (in the camera coordinate system). The coordinate converting unit 1101 reports the created AR-content position and orientation data to the superimposing unit 1102.

The superimposing unit 1102 is an example of a superimposing unit. The superimposing unit 1102 superimposes the AR contents having the position and the orientation specified by the AR-content position and orientation data on the RGB-D image data. The superimposing unit 1102 notifies the display unit 1103 of the RGB-D image data on which the AR contents are superimposed (superimposed image data).

The display unit 1103 displayed the reported superimposed image data on the display 206.

<Procedure for AR-Content Display Process of AR-Content Superimposing Unit>

Figure 12:
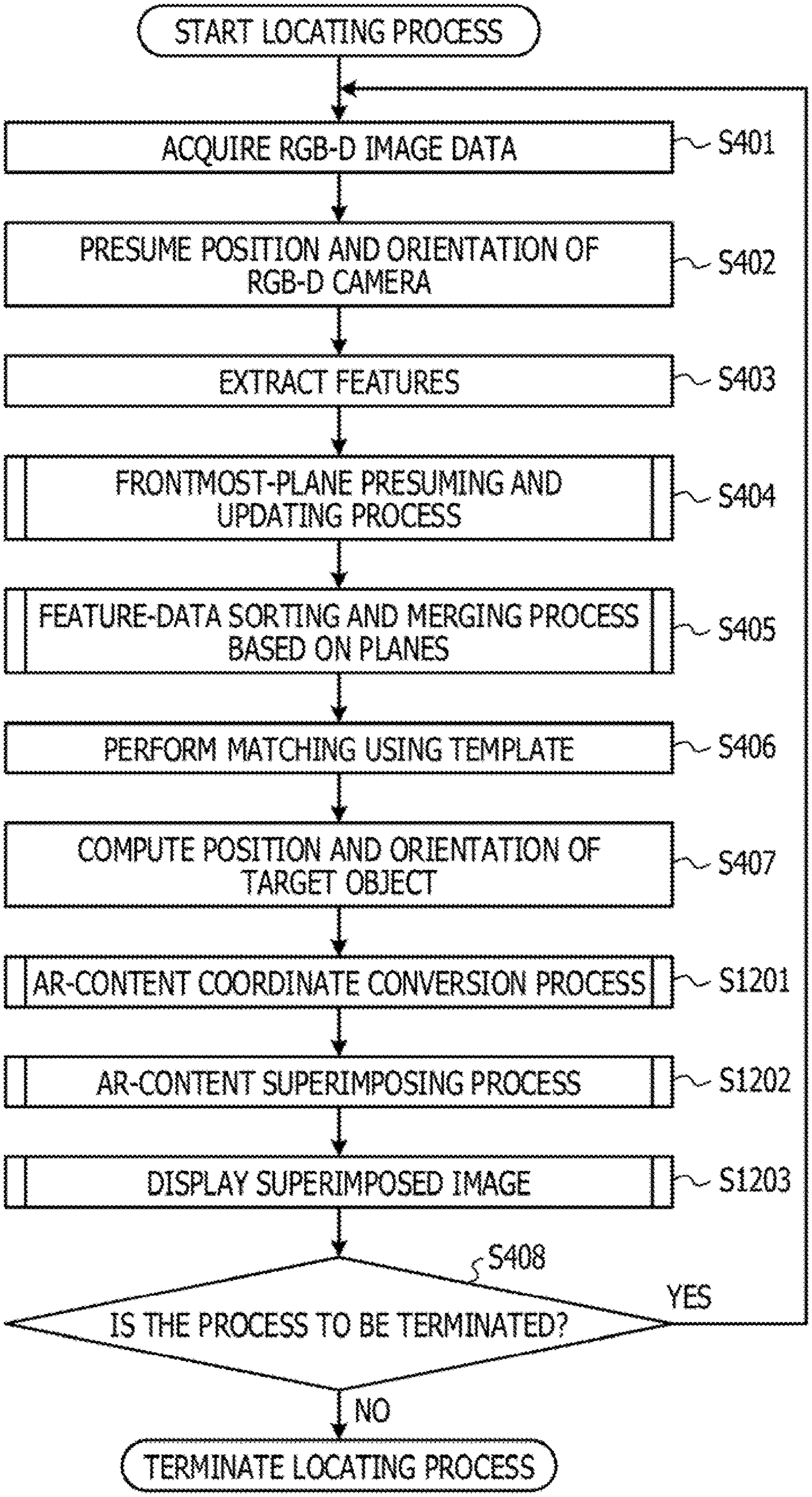
FIG. 12 is a flowchart illustrating the procedure for an AR-content display process.

The procedure for the AR-content display process performed by the AR-content superimposing unit 1001 of the object recognition apparatus 1000 will be described. FIG. 12 is a flowchart illustrating the procedure for the AR-content display process. Since the processes from step S401 to step S407 and step S408 in the flowchart illustrated in FIG. 12 have already been described with reference to FIG. 4, descriptions thereof will be omitted.

In step S1201, the coordinate converting unit 1101 executes an AR-content coordinate conversion process on the AR contents read from the AR-content storage unit 1002 and notifies the superimposing unit 1102 of the resultant AR-content position and orientation data.

In step S1202, the superimposing unit 1102 executes an AR-content superimposing process for superimposing AR contents having the position and the orientation specified by the AR-content position and orientation data on the RGB-D image data.

In step 1203, the display unit 1103 displays the superimposed image data in which the AR contents are superimposed on the display 206.

<Details of AR-Content Display Process>

The details of step S1201 (the AR-content coordinate conversion process) and step S1202 (the AR-content superimposing process) of the AR-content display process (FIG. 12) will be described.

(1) Details of Step S1201 (AR-Content Coordinate Conversion Process)

Figure 13:
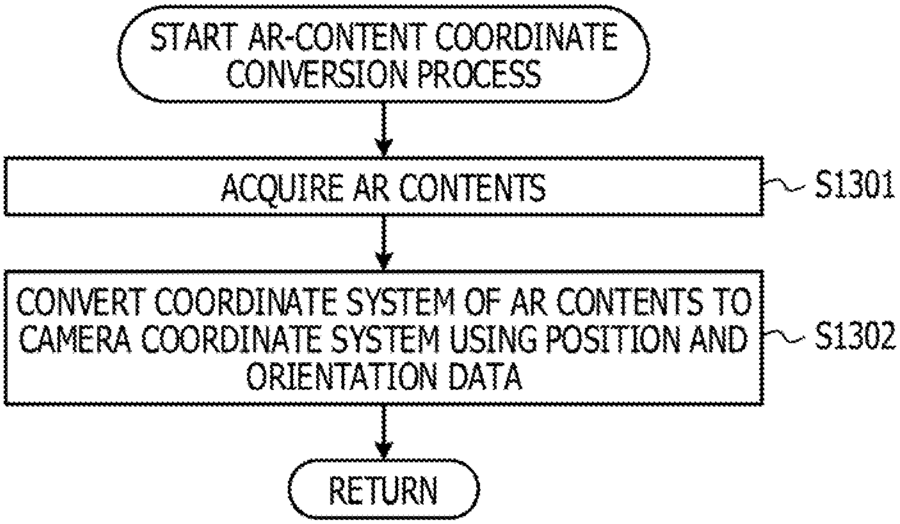
FIG. 13 is a flowchart illustrating the procedure for an AR-content coordinate conversion process.

FIG. 13 is a flowchart illustrating the procedure for the AR-content coordinate conversion process. In step S1301, the coordinate converting unit 1101 reads AR contents from the AR-content storage unit 1002.

In step S1302, the coordinate converting unit 1101 changes the position and the orientation of the AR content by converting the coordinates (in the open-cabinet coordinate system) contained in the AR contents based on the position and orientation data on the open cabinet 130 output from the locating unit 121. Thus, the coordinate converting unit 1101 creates AR-content position and orientation data (in the camera coordinate system).

(2) Details of Step S1202 (AR-Content Superimposing Process)

Figure 14:
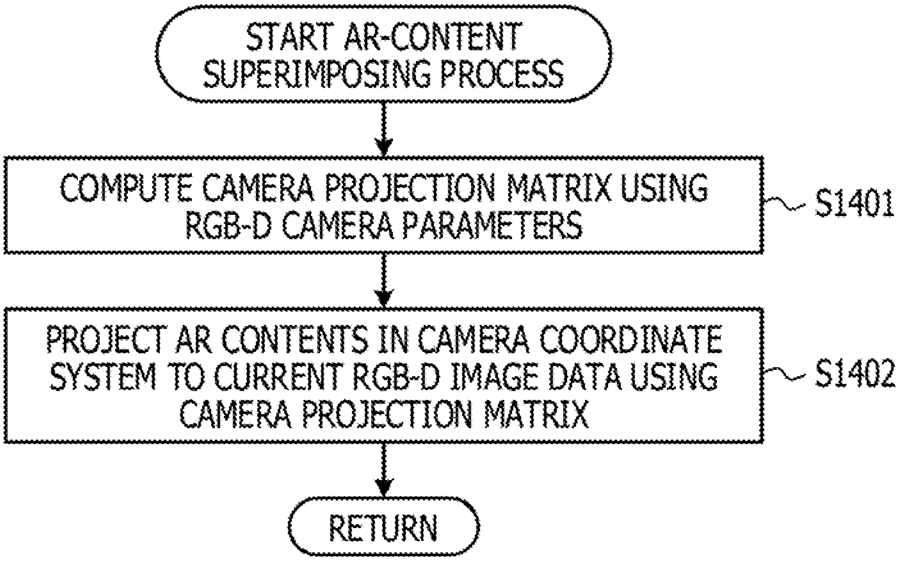
FIG. 14 is a flowchart illustrating the procedure for an AR-content superimposing process.

FIG. 14 is a flowchart illustrating the procedure for the AR-content superimposing process. In step S1401, the superimposing unit 1102 acquires the camera parameters of the RGB-D camera 110 and computes a camera projection matrix using the acquired camera parameters. The camera parameters are projection information unique to the RGB-D camera 110, such as the focal length, the image center position, and lens distortion of the RGB-D camera 110. The unique information is obtained in advance using a general calibration method.

In step S1402, the superimposing unit 1102 projects the AR contents in which the AR-content position and orientation data (in the camera coordinate system) is computed) to the current RGB-D image data.

Figure 15A:
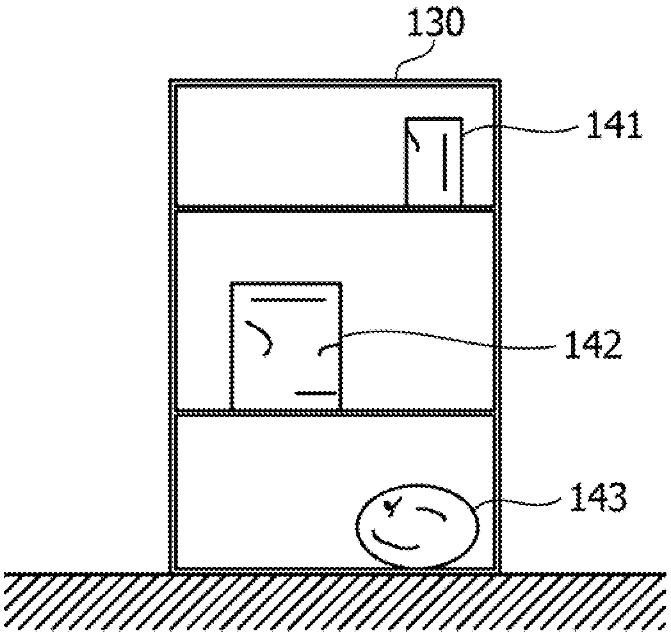
FIGS. 15A and 15B are diagrams illustrating a specific example of the AR-content superimposing process.
Figure 15B:
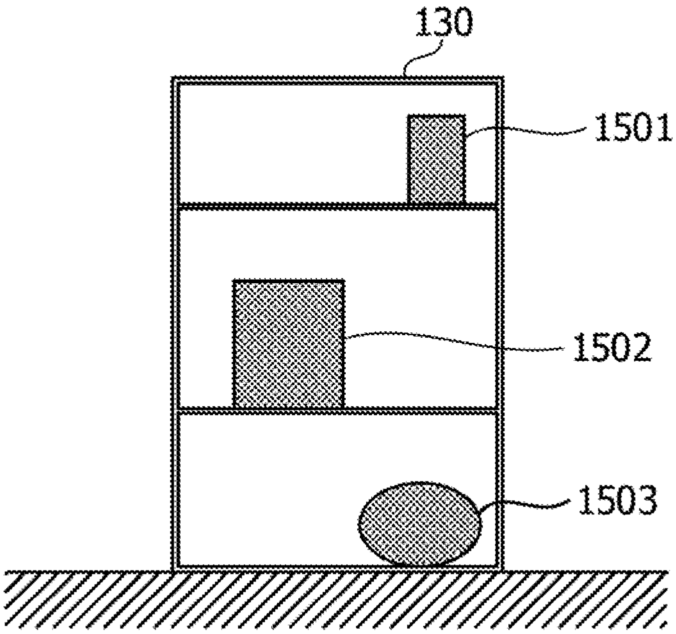

FIGS. 15A and 15B are diagrams illustrating a specific example of the AR-content superimposing process. FIG. 15A is a diagram illustrating the open cabinet 130 before the AR contents are superimposed. FIG. 15A illustrates a front view so that the whole of the open cabinet 130 is viewed. FIG. 15B illustrates a state in which an AR content 1501 corresponding to the stored object 141, an AR content 1502 corresponding to the stored object 142, and an AR content 1503 corresponding to the stored object 143 are superimposed on the RGB-D image data.

As apparent from the above description, the object recognition apparatus 1000 according to the second embodiment converts the coordinates in the AR contents corresponding to the stored objects stored in the open cabinet 130 according to the position and orientation data of the open cabinet 130 to change the position and the orientation of the AR contents. The object recognition apparatus 1000 according to the second embodiment superimposes the AR contents on the RGB-D image data based on the changed position and orientation.

Thus, the object recognition apparatus 1000 according to the second embodiment may superimpose a corresponding AR content on the RGB-D image data for each object stored in the open cabinet 130 for which the position and orientation data is computed and may display the superimposed image data.

Third Embodiment

In the second embodiment, an AR content corresponding to each of the objects stored in the open cabinet 130 is superimposed on the RGB-D image data by using the position and orientation data on the open cabinet 130 for display.

In contrast, in the third embodiment, the objects stored in the open cabinet 130 are detected and managed using the position and orientation data on the open cabinet 130. In the second embodiment, the objects stored in the open cabinet 130 (and the stored position) are known, whereas in the third embodiment, the objects stored in the open cabinet 130 (and the stored position) are not known. A third embodiment will be described hereinbelow focusing on differences from the second embodiment <System Configuration of Object Recognition System>

Figure 16:
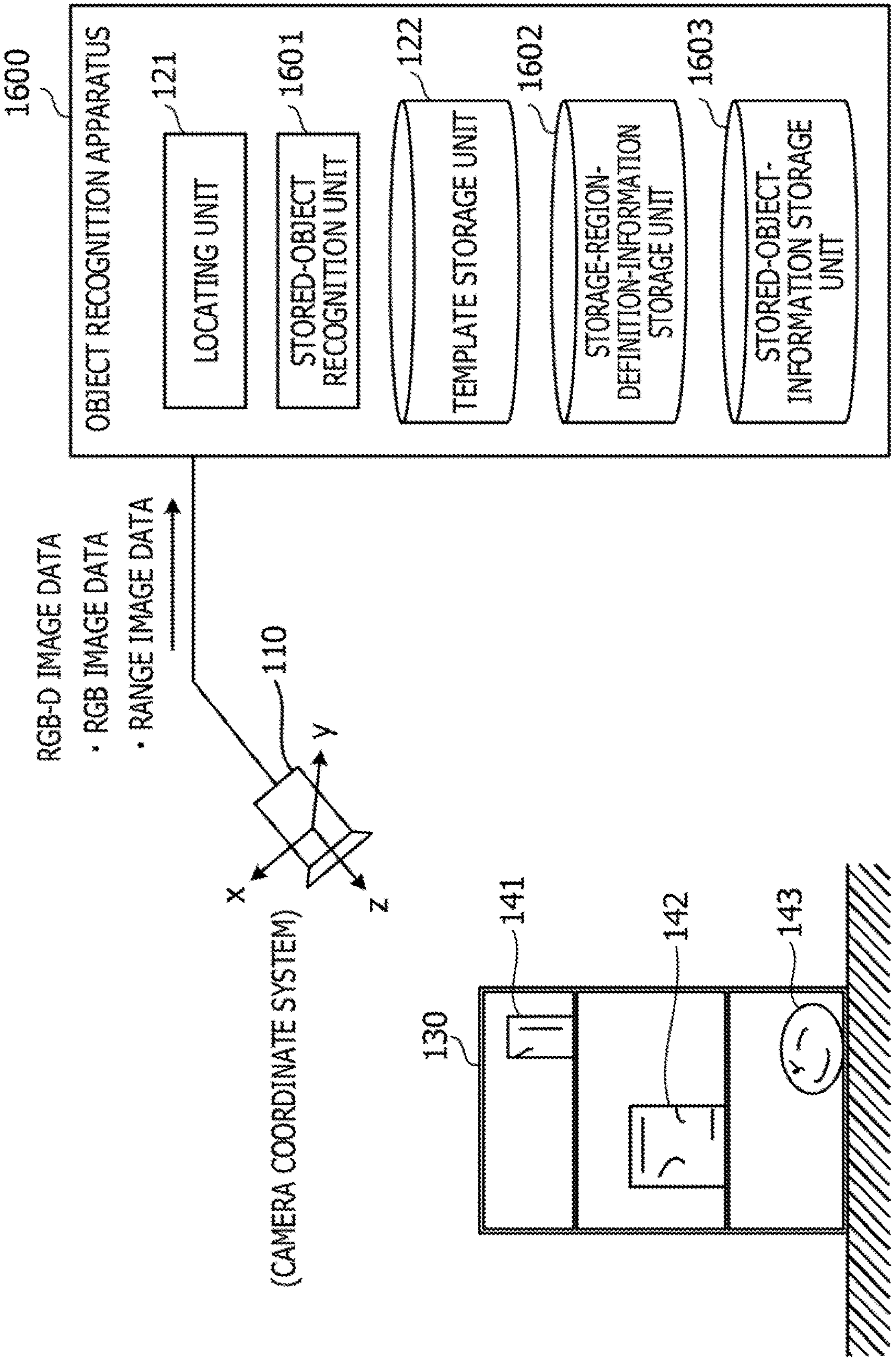
FIG. 16 is a diagram illustrating an example of the system configuration of an object recognition system according to a third embodiment of the present disclosure.

First, the system configuration of the object recognition system will be described. FIG. 16 is a diagram illustrating an example of the system configuration of the object recognition system 100 according to the third embodiment. A difference from the object recognition system 100 described with reference to FIG. 10 is that an object recognition apparatus 1600 has the function of a stored-object recognition unit 1601 in addition to the locating unit 121. Another difference is that the object recognition apparatus 1600 includes a storage-region-definition-information storage unit 1602 and a stored-object-information storage unit 1603.

The stored-object recognition unit 1601 acquires storage-region definition information from the storage-region-definition-information storage unit 1602. The storage-region definition information is definition information that defines the position of the storage region of each shelf of the open cabinet 130.

The stored-object recognition unit 1601 specifies an image region corresponding to the storage region of each shelf from the RGB-D image data and detects a stored object from the specified image region. The stored-object recognition unit 1601 updates the stored-object information stored in the stored-object-information storage unit 1603 based on the stored-object detection result for each of the storage region of each shelf. The stored-object information is a list illustrating what object is stored on which shelf of what open cabinet.

Specific Examples of Storage-Region Definition Information and Stored-Object Information Specific examples of storage-region definition information stored in the storage-region-definition-information storage unit 1602 and stored-object information stored in the stored-object-information storage unit 1603 will be described.

(1) Specific Example of Storage-Region Definition Information

FIG. 17 is a diagram illustrating a specific example of the storage-region definition information. Storage-region definition information 1700 illustrated in FIG. 17 is storage-region definition information on an open cabinet identified by open cabinet ID="T001" and photographed by an RGB-D camera identified by RGB-D camera ID="C001".

As illustrated in FIG. 17, the storage-region definition information 1700 contains information items such as "shelf number", "shelf identifier", and "open-cabinet coordinate system".

The "shelf number" stores information indicating the number of each shelf of the open cabinet identified by open cabinet ID="T001". The "shelf identifier" stores identifiers for identifying the individual shelves. The "open-cabinet coordinate system" stores coordinates (the coordinates in the open-cabinet coordinate system) indicating the position of the storage region of a shelf specified by a corresponding shelf number.

The example in FIG. 17 indicates that the first shelf of the open cabinet 130 identified by open cabinet ID="T00" is a storage region identified by shelf identifier="D001" and the coordinates indicating the position of the storage region is $(x_{t1}, y_{t1}, z_{t1})$.

(2) Specific Example of Stored-Object Information

Figure 18:
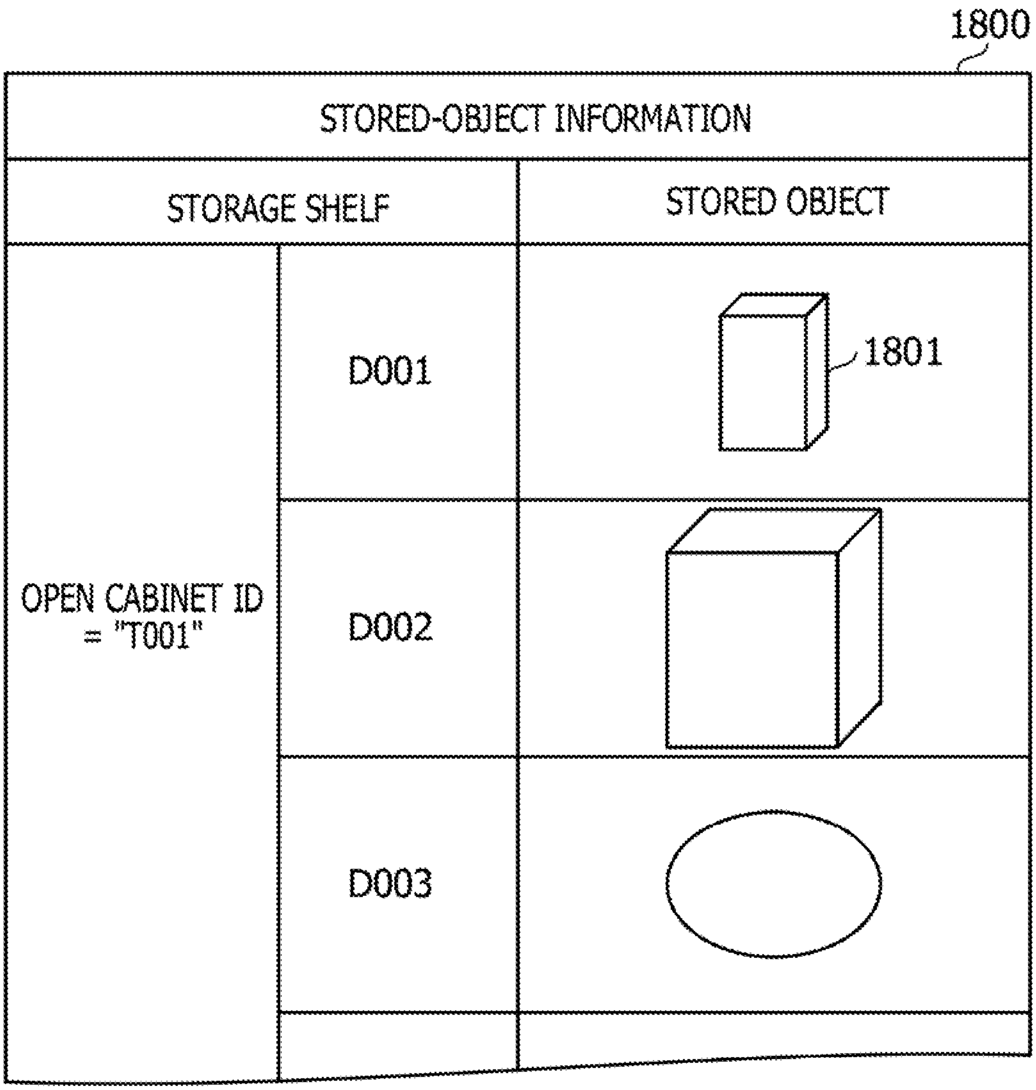
FIG. 18 is a diagram illustrating a specific example of stored-object information.

FIG. 18 is a diagram illustrating a specific example of the stored-object information. As illustrated in FIG. 18, the stored-object information 1800 contains information objects such as "storage shelf" and "stored object".

The "storage shelf" stores open cabinet ID and a shelf identifier indicating the storage shelf in which the object is stored. The "stored object" stores information on an object stored in the storage region of a shelf identified by the shelf identifier of an open cabinet identified by the open cabinet ID.

The example in FIG. 18 illustrates a state in which information 1801 on the stored object 141 is stored the storage region of the first shelf identified by the shelf identifier="D0001" of the open cabinet 130 identified by the open cabinet ID="TO01".

<Outline of Stored-Object Recognition Process>

Figure 19:
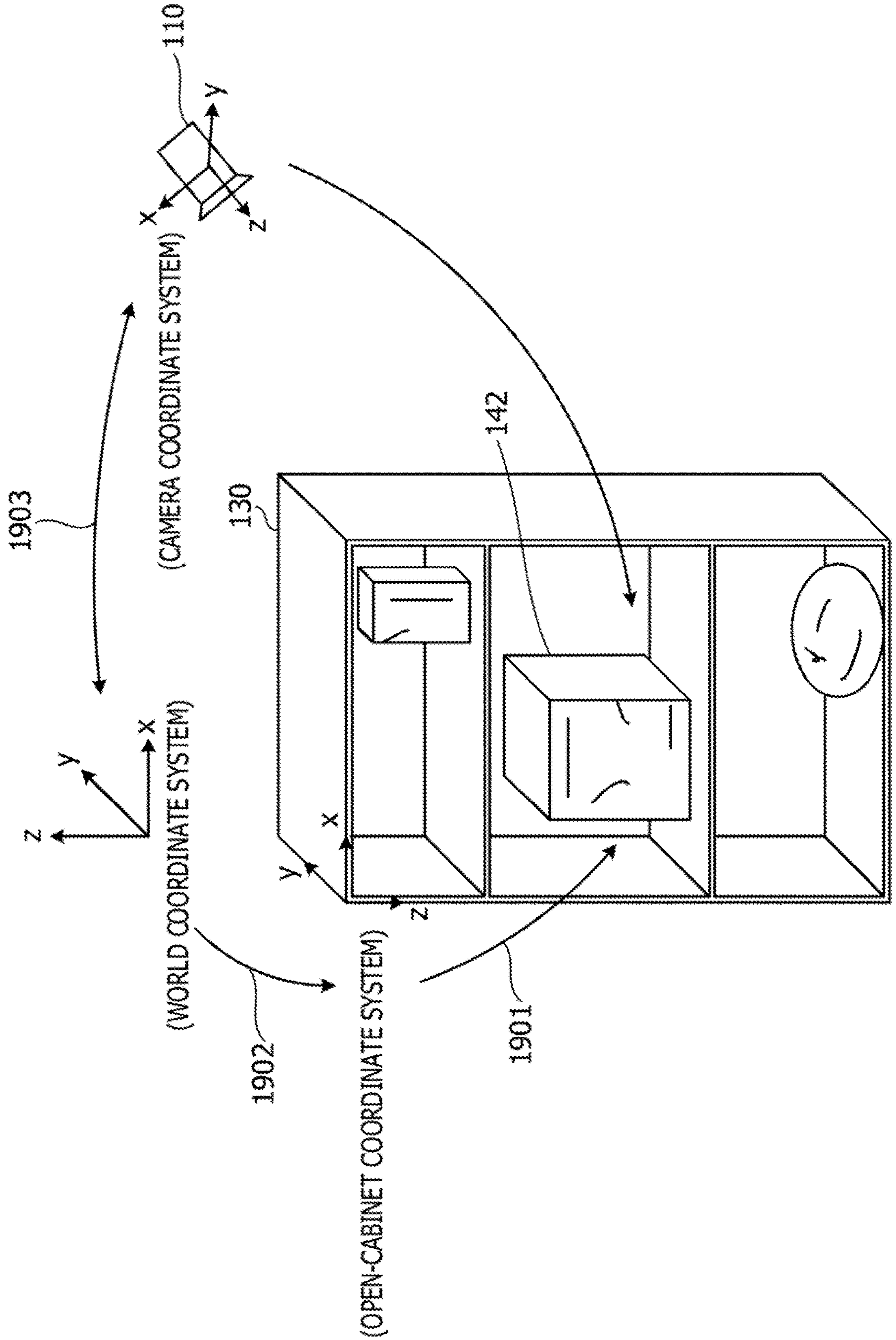
FIG. 19 is a diagram illustrating in outline a stored-object recognition process performed by a stored-object recognition unit.

The outline of a stored-object recognition process performed by the stored-object recognition unit 1601 will be described. FIG. 19 is a diagram illustrating in outline the stored-object recognition process performed by the stored-object recognition unit 1601. As described above, the storage-region definition information 1700 stores coordinates indicating the position of the storage region of each shelf in the open-cabinet coordinate system (see arrow 1901).

The position and the orientation of the open cabinet 130 in the world coordinate system are output from the locating unit 121 as position and orientation data (see arrow 1902). The relationship between the world coordinate system and the camera coordinate system may be specified using the SLAM technique (see arrow 1903).

Therefore, for example, an image region corresponding to the storage region of the second shelf of the open cabinet 130 may be uniquely specified in the RGB-D image data acquired by the RGB-D camera 110 in the camera coordinate system.

This allows the stored-object recognition unit 1601 to create, for example, the stored-object information, which is a list of stored objects in the storage region of the second shelf of the open cabinet 130, by detecting the stored object from the specified image region using a known image recognition technique.

<Functional Configuration of Stored-Object Recognition Unit>

Figure 20:
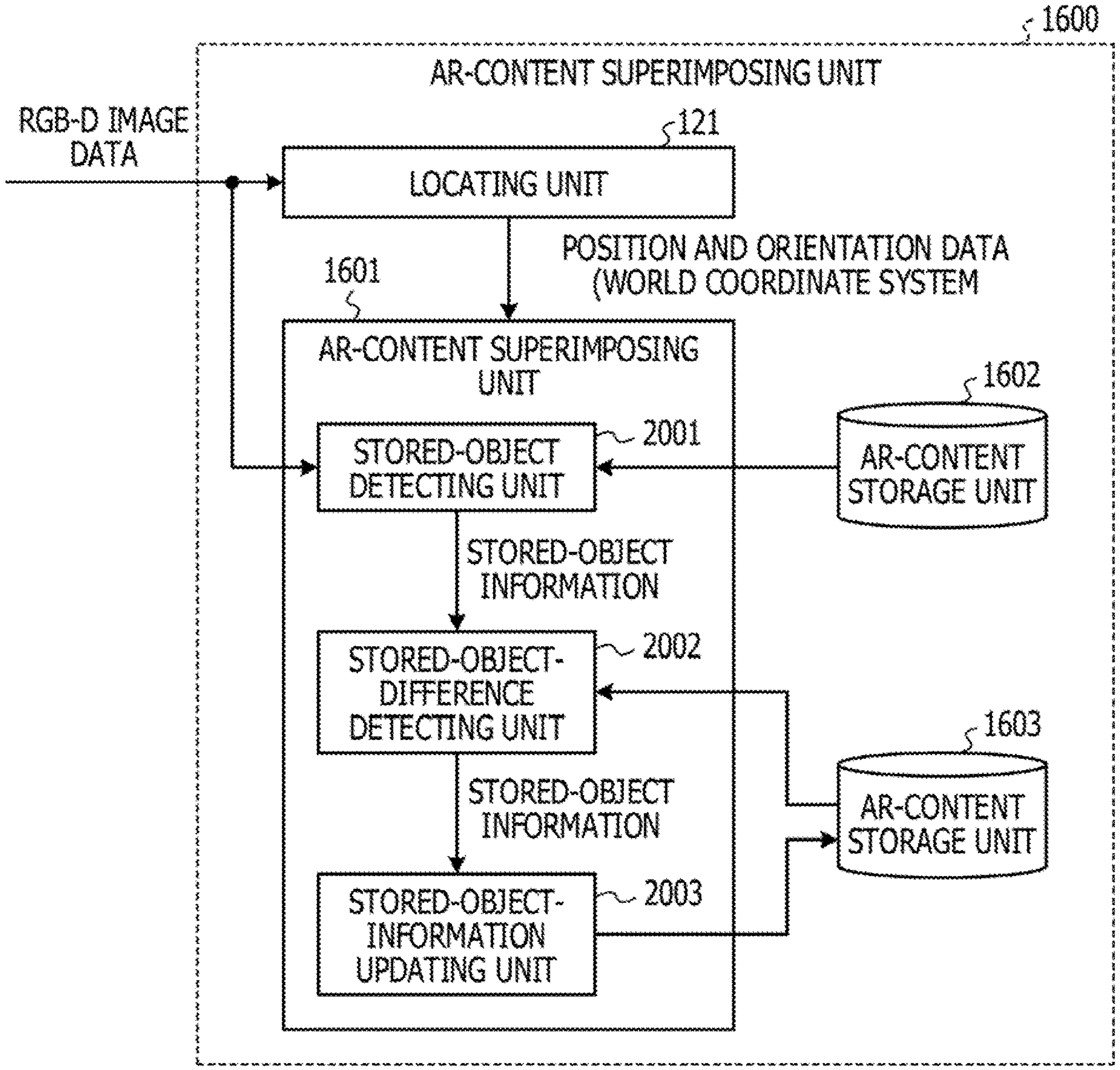
FIG. 20 is a diagram illustrating an example of the functional configuration of the stored-object recognition unit.

The functional configuration of the stored-object recognition unit 1601 of the object recognition apparatus 1600 will be described. FIG. 20 is a diagram illustrating an example of the functional configuration of the stored-object recognition unit 1601 of the object recognition apparatus 1600. As illustrated in FIG. 20, the stored-object recognition unit 1601 includes a stored-object detecting unit 2001, a stored-object-difference detecting unit 2002, and a stored-object-information updating unit 2003.

The stored-object detecting unit 2001 is an example of a detecting unit. The stored-object detecting unit 2001 reads the storage-region definition information 1700 from the storage-region-definition-information storage unit 1602. The stored-object detecting unit 2001 specifies an image region corresponding to the storage region of the shelf centered in image-acquisition on the RGB-D image data based on the position and orientation data (in the world coordinate system) of the open cabinet 130 output from the locating unit 121 and the storage-region definition information 1700.

The stored-object detecting unit 2001 detects a stored object from the specified image region using a known image recognition technique and reports the information on the detected stored object to the stored-object-difference detecting unit 2002.

The stored-object-difference detecting unit 2002 reads the stored-object information 1800 from the stored-object-information storage unit 1603 and compares the stored-object information 1800 with the stored-object information reported from the stored-object detecting unit 2001. If the comparison indicates that there is a difference between the stored-object information 1800 and the stored-object information, the stored-object-difference detecting unit 2002 notifies the stored-object-information updating unit 2003 of information on the stored object corresponding to the difference.

The stored-object-information updating unit 2003 is an example of a creation unit. The stored-object-information updating unit 2003 updates the stored-object information 1800 stored in the stored-object-information storage unit 1603 based on the stored-object information reported from the stored-object-difference detecting unit 2002. For example, when an object is newly added, the stored-object-information updating unit 2003 adds information on the stored object to the stored-object information 1800, whereas when the stored object has been removed, the stored-object-information updating unit 2003 deletes the information on the stored object from the stored-object information 1800.

<Procedure of Stored-Object Recognition Process by Stored-Object Recognition Unit>

Figure 21:
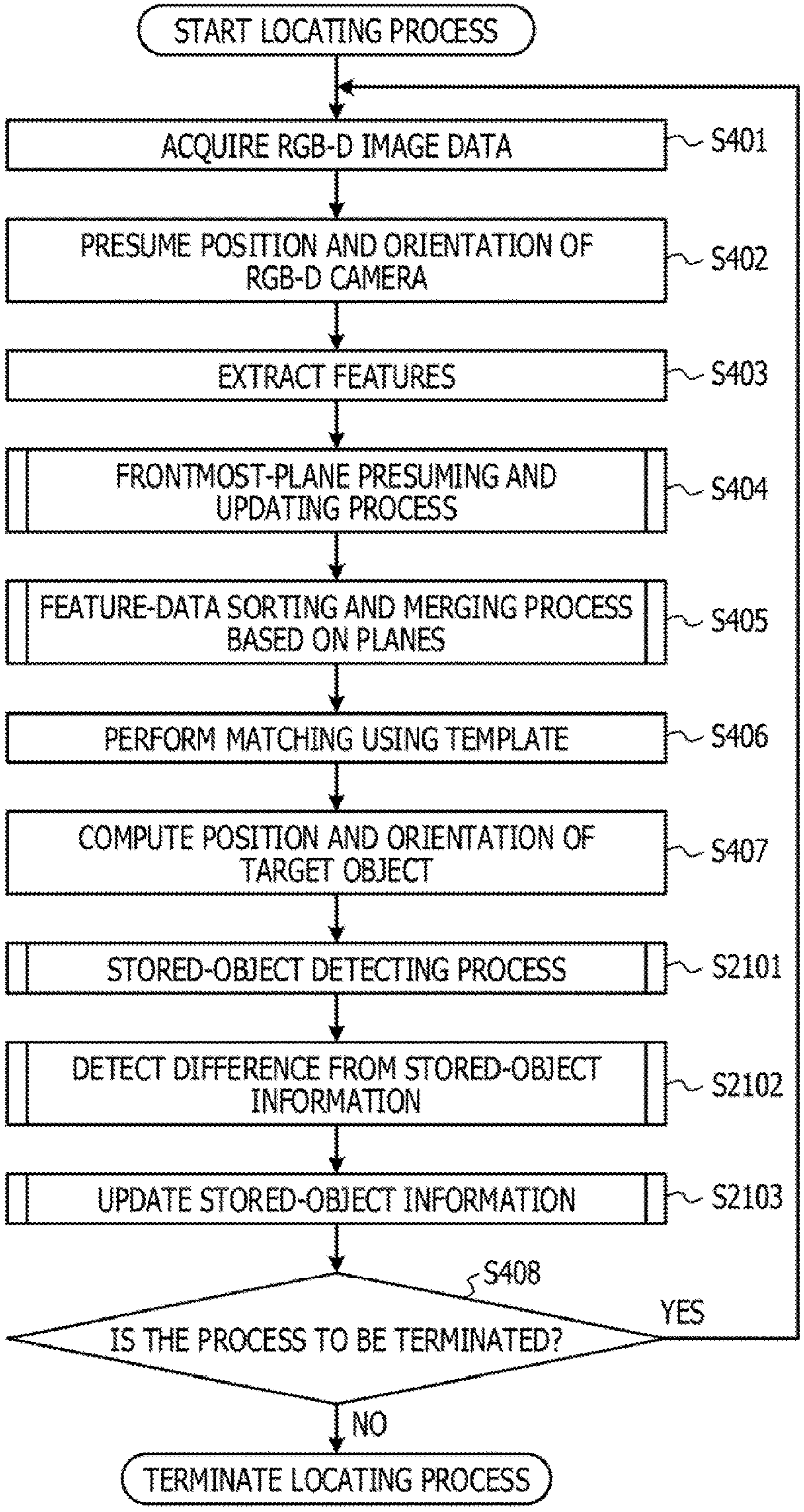
FIG. 21 is a flowchart illustrating the procedure for the stored-object recognition process.

The procedure for the stored-object recognition process performed by the stored-object recognition unit 1601 of the object recognition apparatus 1600 will be described. FIG. 21 is a flowchart illustrating the procedure for the stored-object recognition process. Since the processes from step S401 to step S407 and step S408 in the flowchart in FIG. 21 have already been described with reference to FIG. 4, descriptions thereof will be omitted here.

In step S2101, the stored-object detecting unit 2001 executes a stored-object detecting process to detect a stored object from an image region corresponding to the storage region of a shelf centered in image-acquisition in the open cabinet 130 and reports the information on the detected stored object to the stored-object-difference detecting unit 2002.

In step S2102, the stored-object-difference detecting unit 2002 reads the stored-object information 1800 from the stored-object-information storage unit 1603 and compares the stored-object information 1800 with the stored-object information reported from the stored-object detecting unit 2001 to detect the difference. The stored-object-difference detecting unit 2002 reports the stored-object information corresponding to the difference to the stored-object-information updating unit 2003.

In step S2103, the stored-object-information updating unit 2003 updates the stored-object information 1800 stored in the stored-object-Information storage unit 1603 based on the stored-object information corresponding to the difference reported from the stored-object-difference detecting unit 2002.

<Details of Stored-Object Recognition Process>

Figure 22:
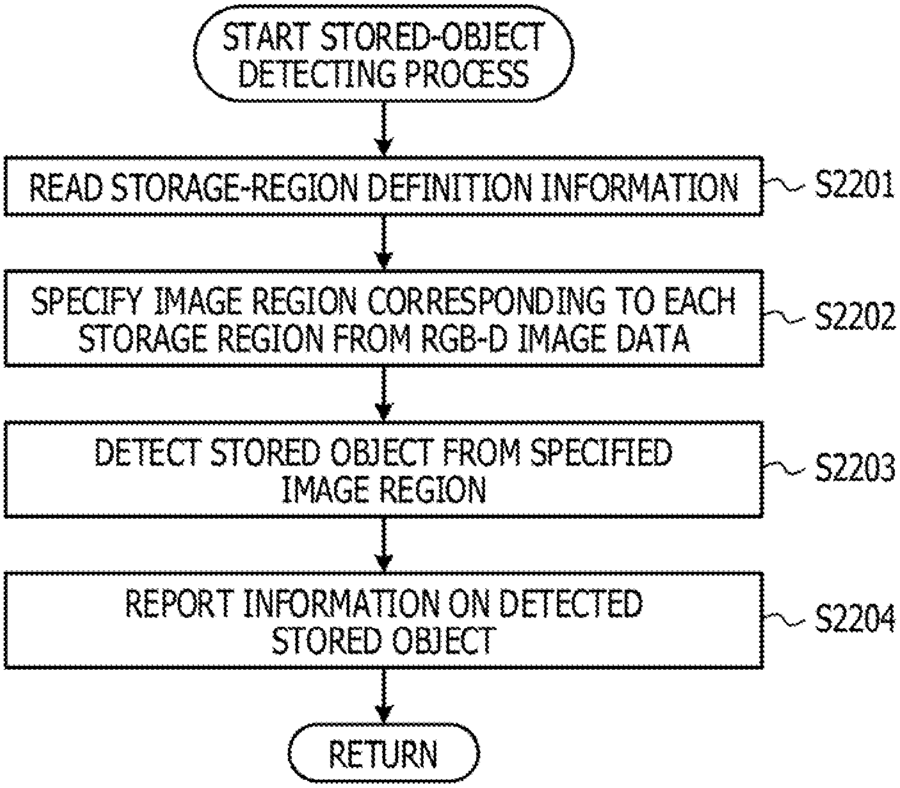
FIG. 22 is a flowchart illustrating the procedure for a stored-object detecting process.

The details of step S2101 (the stored-object detecting process) of the stored-object recognition process (FIG. 21) will be described. FIG. 22 is a flowchart illustrating the procedure for the stored-object detecting process. In step S2201, the stored-object detecting unit 2001 reads the storage-region definition information 1700 from the storage-region-definition-information storage unit 1602.

In step S2202, the stored-object detecting unit 2001 specifies an image region corresponding to each storage region in the RGB-D image data.

In step S2203, the stored-object detecting unit 2001 detects a stored object from the specified image region.

In step S2204, the stored-object detecting unit 2001 reports the information on the detected stored object to the stored-object-difference detecting unit 2002.

As apparent from the above description, the object recognition apparatus 1600 according to the third embodiment defines the storage region of each shelf of the open cabinet 130 in advance and specifies an image region corresponding to the storage region of each shelf based on the recognized position and orientation of the open cabinet 130. The object recognition apparatus 1600 according to the third embodiment updates the stored-object information, which is a list of objects stored in the storage regions of the individual shelves by detecting a stored object for each specified image region.

Thus, even if the stored object stored in the storage region of each shelf of the open cabinet 130 changes, the administrator of the object recognition apparatus 1600 according to the third embodiment may find the stored object after the change.

Other Embodiments

In the first embodiment, the feature merging unit 305 of the locating unit 121 executes the feature-data sorting and merging process based on planes (step S405) when the plane presuming unit 303 presumes plane data. Alternatively, the plane-based feature-data sorting and merging process may be started under the condition that the reliability of the presumed plane data exceeds a predetermined threshold. For example, the reliability of the presumed plane data may be calculated from the degree of match when the feature matching unit 306 executes a matching process.

In the first to third embodiments, the RGB-D camera 110 is separate from the object recognition apparatus 120, 1000, or 1600. Alternatively, the RGB-D camera 110 may be a terminal integrated with the object recognition apparatus 120, 1000, or 1600.

It is to be understood that the present disclosure is not limited to the configurations of the above embodiments and combinations with another element are possible.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An object recognition apparatus comprising:
a memory; and
a processor coupled to the memory and configured to
execute an acquisition process that includes acquiring RGB-depth (D) image data on a target object, the target object having one or more dent spaces configured to store one or more other objects, the RGB-D image data being acquired by an RGB-D camera;
execute a presumption process that includes presuming a frontmost plane of the target object from the acquired RGB-D image data, the frontmost plane being a plane corresponding to a front face of frames forming the one or more dent space;
execute a selecting process that includes selecting features corresponding to a first position specified by the presumed frontmost plane from among features extracted based on the RGB-D image data; and
execute a computing process that includes computing a position and an orientation of the target object by performing matching between the RGB-D image data and a template of the target object using the selected features.

2. The object recognition apparatus according to claim 1, wherein the acquisition process is configured to
acquire first RGB-D image data, of the RGB-D image data, at Nth time (N is an integer equal to or greater than 1), and
acquire second RGB-D image data, of the RGB-D image data, at (N+1)th time,
wherein the presumption process is configured to
presume the frontmost plane based on a first plane and a second plane, the first plane being a plane presumed based on the first RGB-D image data, the second plane being a plane presumed based on the second RGB-D image data.

3. The object recognition apparatus according to claim 2, wherein the selecting process is configured to
select a first feature, from the extracted features, based on the first plane, and
select a second feature, from the extracted features, based on the second plane,
wherein the computing process is configured to
integrate the first feature and the second feature, and
compute the position and the orientation of the target object by using the integrated feature.

4. The object recognition apparatus according to claim 1, wherein the processor is further configured to:
execute a changing process that includes changing a position and an orientation of an augmented reality (AR) content corresponding to the one or more other objects according to the position and the orientation of the target object; and
execute a superimposing process that includes superimposing the AR content whose position and orientation are changed on the RGB-D image data.

5. The object recognition apparatus according to claim 1, wherein the processor is configured to:
execute a detecting process that includes
specifying, for each of storage regions defined as the one or more dent spaces in the target object, an image region in the RGB-D image data, the specified image region being a region corresponding to the each of the storage regions, and
detecting each of the one or more other objects in accordance with each of the specified image regions; and
execute a creation process that includes creating information indicating a list of the detected one or more other objects by using a result of the detecting process.

6. An object recognition method comprising:
executing an acquisition process that includes acquiring RGB-depth (D) image data on a target object, the target object having one or more dent spaces configured to store one or more other objects, the RGB-D image data being acquired by an RGB-D camera;
executing a presumption process that includes presuming a frontmost plane of the target object from the acquired RGB-D image data, the frontmost plane being a plane corresponding to a front face of frames forming the one or more dent space;
executing a selecting process that includes sorting features corresponding to a first position specified by the presumed frontmost plane from among features extracted based on the RGB-D image data; and
executing a computing process that includes computing a position and an orientation of the target object by performing matching between the RGB-D image data and a template of the target object using the selected features.

7. The object recognition method according to claim 6, wherein the acquisition process is configured to
acquire first RGB-D image data, of the RGB-D image data, at Nth time (N is an integer equal to or greater than 1), and
acquire second RGB-D image data, of the RGB-D image data, at (N+1)th time,
wherein the presumption process is configured to
presume the frontmost plane based on a first plane and a second plane, the first plane being a plane presumed based on the first RGB-D image data, the second plane being a plane presumed based on the second RGB-D image data.

8. The object recognition method according to claim 7, wherein the selecting process is configured to
select a first feature, from the extracted features, based on the first plane, and
select a second feature, from the extracted features, based on the second plane,
wherein the computing process is configured to
integrate the first feature and the second feature, and
compute the position and the orientation of the target object using the integrated feature.

9. The object recognition method according to claim 6, the method further comprising:

executing a changing process that includes changing a position and an orientation of an augmented reality (AR) content corresponding to the one or more other objects according to the position and the orientation of the target object; and executing a superimposing process that includes superimposing the AR content whose position and orientation are changed on the RGB-D image data.

10. The object recognition method according to claim 6, the method further comprising:

executing a detecting process that includes specifying, for each of storage regions defined as the one or more dent spaces in the target object, an image region in the RGB-D image data, the specified image region being a region corresponding to the each of the storage regions, and detecting each of the one or more other objects in accordance with each of the specified image regions; and executing a creation process that includes creating information indicating a list of the detected one or more other objects by using a result of the detecting process.

11. A non-transitory computer-readable storage medium for storing a program which causes a processor to perform processing for object recognition, the processing comprising:

executing an acquisition process that includes acquiring RGB-depth (D) image data on a target object, the target object having one or more dent spaces configured to store one or more other objects, the RGB-D image data being acquired by an RGB-D camera;

executing a presumption process that includes presuming a frontmost plane of the target object from the acquired RGB-D image data, the frontmost plane being a plane corresponding to a front face of frames forming the one or more dent space;

executing a selecting process that includes selecting features corresponding to a first position specified by the presumed frontmost plane from among features extracted based on the RGB-D image data; and executing a computing process that includes computing a position and an orientation of the target object by performing matching between the RGB-D image data and a template of the target object using the selected features.

12. The non-transitory computer-readable storage medium according to claim 11, wherein the acquisition process is configured to acquire first RGB-D image data, of the RGB-D image data, at Nth time (N is an integer equal to or greater than 1), and acquire second RGB-D image data, of the RGB-D image data, at (N+1)th time, wherein the presumption process is configured to presume the frontmost plane based on a first plane and a second pane, the first plane being a plane presumed based on the first RGB-D image data, the second plane being a plane presumed based on the second RGB-D image data.

13. The non-transitory computer-readable storage medium according to claim 12, wherein the selecting process is configured to select a first feature, from the extracted features, based on the first plane, and select a second feature, from the extracted features, based on the second plane, wherein the computing process is configured to integrate the first feature and the second feature, and compute the position and the orientation of the target object using the integrated feature.

14. The non-transitory computer-readable storage medium according to claim 11, the processing further comprising:

executing a changing process that includes changing a position and an orientation of an augmented reality (AR) content corresponding to the one or more other objects according to the position and the orientation of the target object; and executing a superimposing process that includes superimposing the AR content whose position and orientation are changed on the RGB-D image data.

15. The non-transitory computer-readable storage medium according to claim 11, the processing further comprising:

executing a detecting process that includes specifying, for each of storage regions defined as the one or more dent spaces in the target object, an image region in the RGB-D image data, the specified image region being a region corresponding to the each of the storage regions, and detecting each of the one or more other objects in accordance with each of the specified image regions; and executing a creation process that includes creating information indicating a list of the detected one or more other objects by using a result of the detecting process.

* * * * *